United States Patent
Kapoor et al.

(10) Patent No.: US 10,015,836 B2
(45) Date of Patent: *Jul. 3, 2018

(54) MASTER DEVICE FOR USING CONNECTION ATTRIBUTE OF ELECTRONIC ACCESSORIES CONNECTIONS TO FACILITATE LOCATING AN ACCESSORY

(71) Applicant: Apple Inc., Cupertino, CA (US)

(72) Inventors: Daman Kapoor, San Francisco, CA (US); Robert D. Watson, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,246

(22) Filed: Nov. 29, 2017

(65) Prior Publication Data

US 2018/0092145 A1    Mar. 29, 2018

Related U.S. Application Data

(63) Continuation of application No. 15/456,223, filed on Mar. 10, 2017, now Pat. No. 9,860,329, which is a
(Continued)

(51) Int. Cl.
*H04W 4/80* (2018.01)
*H04W 76/14* (2018.01)
(Continued)

(52) U.S. Cl.
CPC .............. *H04W 76/14* (2018.02); *H04R 3/12* (2013.01); *H04W 4/008* (2013.01); *H04W 4/80* (2018.02);
(Continued)

(58) Field of Classification Search
CPC .................. H04W 4/80; H04W 76/14
See application file for complete search history.

(56) References Cited

U.S. PATENT DOCUMENTS 5,910,776 A    6/1999    Black
6,369,706 B1   4/2002    Anderson et al.
(Continued)

FOREIGN PATENT DOCUMENTS

WO    2010/126846    11/2010
WO    2016/089939    6/2016

OTHER PUBLICATIONS

Preliminary Report on Patentability dated Jun. 15, 2017 in International Application No. PCT/US2015/063320. 7 pages.
(Continued)

*Primary Examiner* — Tuan H Nguyen
(74) *Attorney, Agent, or Firm* — Kilpatrick Townsend & Stockton LLP

(57) ABSTRACT

A connection-indicative signal can be received at a master electronic device from an electronic accessory. The connection-indicative signal can include a connection attribute indicative of a presence or characteristic of a connection between the electronic accessory and at least one other electronic accessory of the master electronic device. A location of the master electronic device can be determined at the master electronic device. The location can be stored at the master electronic device in association with the connection attribute. The master electronic device can detect a locate-accessory input that corresponds to a request to locate the at least one other electronic accessory; or that a locate-accessory condition is satisfied based on another connection attribute included in another connection-indicative signal received from the electronic accessory. The stored location can be retrieved in response to the detecting. A presentation
(Continued)

that includes location information that corresponds to the stored location can be presented.

17 Claims, 12 Drawing Sheets

Related U.S. Application Data continuation of application No. 14/560,649, filed on Dec. 4, 2014, now Pat. No. 9,641,622.

(51) Int. Cl.
    *H04R 3/12*     (2006.01)
    *H04W 4/00*     (2018.01)
    *H04W 76/02*     (2009.01)

(52) U.S. Cl.
    CPC ....... *H04W 76/023* (2013.01); *H04R 2420/07* (2013.01)

(56) References Cited

U.S. PATENT DOCUMENTS

| | | | |
|---|---|---|---|
| 6,831,896 B1 | 12/2004 | Lempiö et al. | |
| 7,059,182 B1 | 6/2006 | Ragner | |
| 7,342,497 B2 | 3/2008 | Chung et al. | |
| 7,376,393 B2 | 5/2008 | Ono et al. | |
| 7,474,677 B2 | 1/2009 | Trott et al. | |
| 7,558,529 B2 | 7/2009 | Seshadri et al. | |
| 7,761,591 B2 | 7/2010 | Graham et al. | |
| 8,353,050 B2 | 1/2013 | Klassen et al. | |
| 8,538,401 B2 | 9/2013 | Kim et al. | |
| 8,803,817 B1 | 8/2014 | Froment et al. | |
| 8,892,036 B1 * | 11/2014 | Causey | H04M 1/7253 455/41.2 |
| 8,953,799 B2 | 2/2015 | Klassen et al. | |
| 9,467,494 B1 | 10/2016 | Mahalingaiah | |
| 2005/0020279 A1 | 1/2005 | Markhovsky et al. | |
| 2005/0285739 A1 | 12/2005 | Velhal et al. | |
| 2006/0012476 A1 | 1/2006 | Markhovsky et al. | |
| 2006/0111835 A1 | 5/2006 | Baker et al. | |
| 2006/0166715 A1 * | 7/2006 | Van Engelen | H04M 1/6033 455/575.2 |
| 2007/0224980 A1 | 9/2007 | Wakefield et al. | |
| 2008/0119953 A1 | 5/2008 | Reed et al. | |
| 2008/0120196 A1 | 5/2008 | Reed et al. | |
| 2008/0125040 A1 | 5/2008 | Kalayjian et al. | |
| 2009/0058670 A1 | 3/2009 | Sweeney et al. | |
| 2009/0264114 A1 | 10/2009 | Virolainen et al. | |
| 2009/0325599 A1 | 12/2009 | Vuori et al. | |
| 2010/0128887 A1 | 5/2010 | Lee et al. | |
| 2010/0159833 A1 | 6/2010 | Lewis et al. | |
| 2010/0184378 A1 | 7/2010 | Wakefield et al. | |
| 2010/0245054 A1 | 9/2010 | Kim et al. | |
| 2011/0055546 A1 | 3/2011 | Klassen et al. | |
| 2011/0124326 A1 | 5/2011 | Kudo et al. | |
| 2011/0215952 A1 | 9/2011 | Aria et al. | |
| 2011/0291886 A1 | 12/2011 | Krieter et al. | |
| 2012/0114132 A1 | 5/2012 | Abrahamsson et al. | |
| 2012/0176746 A1 | 7/2012 | Chen et al. | |
| 2012/0310391 A1 | 12/2012 | Sanders et al. | |
| 2013/0097676 A1 | 4/2013 | Klassen et al. | |
| 2013/0151709 A1 | 6/2013 | Luna et al. | |
| 2013/0322462 A1 | 12/2013 | Poulsen et al. | |
| 2014/0111307 A1 | 4/2014 | Ingrassia, Jr. et al. | |
| 2014/0146982 A1 | 5/2014 | Pelosi et al. | |
| 2014/0162701 A1 | 6/2014 | Jellinek et al. | |
| 2014/0191960 A1 | 7/2014 | Jeong et al. | |
| 2014/0292567 A1 | 10/2014 | Feldhaus et al. | |
| 2014/0358984 A1 | 12/2014 | Philippe et al. | |
| 2015/0061971 A1 | 3/2015 | Choi et al. | |
| 2015/0067521 A1 | 3/2015 | Heo et al. | |
| 2015/0201023 A1 | 7/2015 | Kotab | |
| 2016/0034416 A1 | 2/2016 | Chavez et al. | |
| 2016/0050160 A1 | 2/2016 | Li et al. | |
| 2016/0094930 A1 | 3/2016 | Ramanna et al. | |
| 2016/0164973 A1 | 6/2016 | Kapoor et al. | |
| 2016/0165381 A1 | 6/2016 | Kapoor et al. | |
| 2016/0227017 A1 | 8/2016 | Kotab | |

OTHER PUBLICATIONS

"Advisory Action," dated Feb. 19, 2016, in U.S. Appl. No. 13/659,217. 5 pages.
"Final Office Action," dated Oct. 15, 2014, in U.S. Appl. No. 13/659,217. 14 pages.
"Final Office Action," dated Oct. 29, 2015, in U.S. Appl. No. 13/659,217. 15 pages.
"Non-Final Office Action," dated May 8, 2014, in U.S. Appl. No. 13/659,217. 11 pages.
"Non-Final Office Action," dated May 20, 2015, in U.S. Appl. No. 13/659,217. 11 pages.
"Final Office Action," dated Sep. 23, 2016, in U.S. Appl. No. 14/560,474. 22 pages.
"Non-Final Office Action," dated Jun. 27, 2016, in U.S. Appl. No. 14/560,474. 15 pages.
"Notice of Allowance," dated Dec. 8, 2016, in U.S. Appl. No. 14/560,474. 5 pages.
U.S. Appl. No. 14/560,474, filed Dec. 4, 2014.
U.S. Appl. No. 15/456,223, filed Mar. 10, 2017.
"First Action Interview Pilot Program Pre-Interview Communication," dated Oct. 12, 2016, in U.S. Appl. No. 14/560,649. 5 pages.
"Notice of Allowance," dated Dec. 21, 2016, in U.S. Appl. No. 14/560,649. 30 pages.
U.S. Appl. No. 14/560,649, filed Dec. 4, 2014.
Brownlee et al., "You'll Never Lose Your Keys, iPhone or Kid Again If You Buy The HipKey [Review]," Jan. 25, 2013, 15 pages.
Hayes, "You Can Now Buy Those Futuristic Earbuds From the Movie Her" downloaded from http://www.fastcompany.com/3032016/you-can-now-buy-those-futuristic-earbuds-from-the-movie-her. Jun. 17, 2014. 6 pages.
Matsumura et al., "Universal earphones: earphones with automatic side and shared use detection," Proceedings of the 2012 ACM international conference on Intelligent User Interfaces, Copyright 2012 JST All Rights Reserved, 2012. 1 page.
Mikeyvanilli, "Find Band Feature in UP 3.0 App.," Jawbone Community Forum, Nov. 14, 2013. 4 pages.
Pasolini, "Button TrackR Adds Crowd Sourced Tracking to Search for Lost Objects," http://www.gizmag.com/button-trackr-app/27928/. Jun. 18, 2013. 8 pages.
"International Search Report and Written Opinion," dated Feb. 22, 2016 in International Patent Application No. PCT/US2015/063320. 10 pages.
First Action Interview Pilot Program Pre-Interview Communication dated Aug. 15, 2017 in U.S. Appl. No. 15/456,223. 4 pages.
Notice of Allowance dated Oct. 25, 2017 in U.S. Appl. No. 15/456,223. 8 pages.
First Office Action dated Mar. 30, 2018 in Chinese Application No. 201580063959.2. 8 pages (includes English translation).

* cited by examiner

900

| Time | Master Device Location | Connection Attributes | |
|---|---|---|---|
| 9/16/14, 08:05:15 | (lat1,long1) | Master-Accessory1 Connection Strength: 10 | Accessory1-Accessory2 Connection Strength: 10 |
| 9/16/14, 08:06:15 | (lat2,long2) | Master-Accessory1 Connection Strength: 10 | Accessory1-Accessory2 Connection Strength: 7 |
| 9/16/14, 08:07:15 | (lat3,long3) | Master-Accessory1 Connection Strength: 10 | Accessory1-Accessory2 Connection Strength: 3 |
| 9/16/14, 08:08:15 | (lat4,long4) | Master-Accessory1 Connection Strength: 10 | No Accessory1-Accessory2 Connection |
| 9/16/14, 10:21:37 | (lat5,long5) | Master-Accessory1 Connection Strength: 10 | Accessory1-Accessory2 Connection Strength: 10 |
| 9/16/14, 10:48:09 | (lat6,long6) | Master-Accessory1 Connection Strength: 8 | Accessory1-Accessory2 Connection Strength: 10 |
| 9/16/14, 10:49:09 | (lat7,long7) | Master-Accessory1 Connection Strength: 3 | Accessory1-Accessory2 Connection Strength: 10 |
| 9/16/14, 10:50:09 | (lat8,long8) | No Master-Accessory1 Connection | Not available |

FIG. 9

MASTER DEVICE FOR USING CONNECTION ATTRIBUTE OF ELECTRONIC ACCESSORIES CONNECTIONS TO FACILITATE LOCATING AN ACCESSORY

CROSS-REFERENCE TO RELATED APPLICATIONS

This application is a continuation of and claims the benefit of and priority to U.S. patent application Ser. No. 15/456,223, filed Mar. 10, 2017, entitled, "MASTER DEVICE FOR USING CONNECTION ATTRIBUTE OF ELECTRONIC ACCESSORIES CONNECTIONS TO FACILITATE LOCATING AN ACCESSORY," which is a continuation of U.S. patent application Ser. No. 14/560,649, filed Dec. 4, 2014, entitled "MASTER DEVICE FOR USING CONNECTION ATTRIBUTE OF ELECTRONIC ACCESSORIES CONNECTIONS TO FACILITATE LOCATING AN ACCESSORY". Each of these applications is hereby incorporated by reference in its entirety for all purposes.

The present disclosure is related to U.S. application Ser. No. 14/560,474, filed on Dec. 4, 2014, entitled "ELECTRONIC ACCESSORY FOR DETECTING AND COMMUNICATING A CONNECTION ATTRIBUTE CORRESPONDING TO ANOTHER ELECTRONIC ACCESSORY," which is hereby incorporated by reference in its entirety for all purposes.

FIELD OF INVENTION

The present disclosure relates generally to using direct or indirect connection attributes to track a location of each of one or more electronic accessories of a master electronic device.

BACKGROUND

Electronic devices are becoming increasingly interconnected. By establishing connections between devices, a performance capability, convenience and/or user appeal can be expanded beyond what a single device could provide. A drawback is that user handling of multiple devices is cumbersome. This can be particularly pronounced when a connection is a wired connection, as a user must then not only track and position multiple devices but also the wired connector. Technology can enable devices to communicate wirelessly, though this has a consequence of eliminating a physical tether between the devices, such that it can be easier to misplace, drop or forget one of the devices.

SUMMARY

In some embodiments, a computer-implemented method can be provided. At an electronic accessory of a master electronic device, a connection attribute can be detected that is indicative of a presence or a characteristic of a connection between the electronic accessory and at least one other electronic accessory of the master electronic device. A connection-indicative signal can be generated at the electronic device that includes the connection attribute. The connection-indicative signal can be transmitted to the master electronic device.

In some embodiments, an electronic accessory of a master electronic device can be provided. The electronic accessory can include one or more processors and a computer-readable storage medium containing instructions, that, when executed by the one or more processors, cause the one or more processors to perform actions. The actions can include detecting, at the electronic accessory of the master electronic device, a connection attribute that is indicative of a presence or a characteristic of a connection between the electronic accessory and at least one other electronic accessory of the master electronic device. The actions can further include generating, at the electronic accessory, a connection-indicative signal that includes the connection attribute. The actions can still further include transmitting the connection-indicative signal to the master electronic device.

In some embodiments, a system can be provided. The system can include a connection assessment module for detecting, at an electronic accessory of a master electronic device, a connection attribute that is indicative of a presence or a characteristic of a connection between the electronic accessory and at least one other electronic accessory of the master electronic device. The system can also include a signal generation module for generating, at the electronic accessory, a connection-indicative signal that includes the connection attribute. The system can further include a transceiver module for transmitting the connection-indicative signal to the master electronic device.

In some embodiments, a system can be provided. The system can include a master electronic device. The system can also include an electronic accessory of the master electronic device. The electronic accessory can include one or more processors and a computer-readable storage medium containing instructions, that, when executed by the one or more processors, cause the one or more processors to perform actions. The actions can include detecting, at the electronic accessory of the master electronic device, a connection attribute that is indicative of a presence or a characteristic of a connection between the electronic accessory and at least one other electronic accessory of the master electronic device. The actions can further include generating, at the electronic accessory, a connection-indicative signal that includes the connection attribute. The actions can still further include transmitting the connection-indicative signal to the master electronic device.

In some embodiments, a system can be provided. The system can include an electronic accessory of a master electronic device. The electronic accessory can include one or more processors and a computer-readable storage medium containing instructions, that, when executed by the one or more processors, cause the one or more processors to perform actions. The actions can include detecting, at the electronic accessory of the master electronic device, a connection attribute that is indicative of a presence or a characteristic of a connection between the electronic accessory and at least one other electronic accessory of the master electronic device. The actions can further include generating, at the electronic accessory, a connection-indicative signal that includes the connection attribute. The actions can still further include transmitting the connection-indicative signal to the master electronic device. The system can further include the at least one other electronic accessory.

In some embodiments, a computer-implemented method can be provided. A connection-indicative signal can be received at a master electronic device from an electronic accessory of the master electronic device. The connection-indicative signal can include a connection attribute that is indicative of a presence or a characteristic of a connection between the electronic accessory and at least one other electronic accessory of the master electronic device. A location of the master electronic device can be determined at the master electronic device. The location can be stored at the master electronic device in association with the connection attribute. The master electronic device can detect a locate-accessory input received at the master electronic device that corresponds to a request to locate the at least one other electronic accessory; or that a locate-accessory condition is satisfied based on another connection attribute included in another connection-indicative signal received from the electronic accessory. The stored location can be retrieved in response to the detecting. A presentation that includes location information that corresponds to the stored location can be presented.

In some embodiments, a master electronic device can be provided. The master electronic device can include one or more processors and a computer-readable storage medium containing instructions, that, when executed by the one or more processors, cause the one or more processors to perform actions. The actions can include receiving, at the master electronic device, a connection-indicative signal from an electronic accessory of the master electronic device. The connection-indicative signal can include a connection attribute that is indicative of a presence or a characteristic of a connection between the electronic accessory and at least one other electronic accessory of the master electronic device. The actions can also include determining, at the master electronic device, a location of the master electronic device and storing, at the master electronic device, the location in association with the connection attribute. The actions can further include detecting, at the master electronic device: a locate-accessory input received at the master electronic device that corresponds to a request to locate the at least one other electronic accessory; or that a locate-accessory condition is satisfied based on another connection attribute included in another connection-indicative signal received from the electronic accessory. The actions can still further include retrieving, in response to the detecting, the stored information and presenting a presentation that includes location information that corresponds to the stored location.

In some embodiments, a system can be provided. The system can include a transceiver module for receiving, at a master electronic device, a connection-indicative signal from an electronic accessory of the master electronic device that includes a connection attribute that is indicative of a presence or a characteristic of a connection between the electronic accessory and at least one other electronic accessory of the master electronic device. The system can also include a location detector module for determining, at the master electronic device, a location of the master electronic device and a location history module for storing, at the master electronic device, the location in association with the connection attribute. The system can further include a device director module for detecting, at the master electronic device: a locate-accessory input received at the master electronic device that corresponds to a request to locate the at least one other electronic accessory; or that a locate-accessory condition is satisfied based on another connection attribute included in another connection-indicative signal received from the electronic accessory. The location history module can further be for, in response to the detecting, retrieving the stored location. The system can also include an interface module for presenting a presentation that includes location information that corresponds to the stored location.

In some embodiments, a system can be provided. The system can include a master electronic device that can include one or more processors and a computer-readable storage medium containing instructions, that, when executed by the one or more processors, cause the one or more processors to perform actions. The actions can include receiving, at the master electronic device, a connection-indicative signal from an electronic accessory of the master electronic device that includes a connection attribute that is indicative of a presence or a characteristic of a connection between the electronic accessory and at least one other electronic accessory of the master electronic device. The actions can also include determining, at the master electronic device, a location of the master electronic device and storing, at the master electronic device, the location in association with the connection attribute. The actions can further include detecting, at the master electronic device: a locate-accessory input received at the master electronic device that corresponds to a request to locate the at least one other electronic accessory; or that a locate-accessory condition is satisfied based on another connection attribute included in another connection-indicative received from the electronic accessory. The actions can still further include retrieving, in response to the detecting, the stored location and presenting a presentation that includes location information that corresponds to the stored location. The system can also include the electronic accessory.

In some embodiments, a computer-implemented method can be provided. A connection-indicative signal can be received at a master electronic device from an electronic accessory of the master electronic device that includes a connection attribute that is indicative of a presence or a characteristic of a connection between the electronic accessory and at least one other electronic accessory of the master electronic device. A determination can be made, at the master electronic device and based on the connection attribute, that an alert condition is satisfied. In response to determining that the alert condition is satisfied, a presentation of an alert can be facilitated.

In some embodiments, a master electronic device can be provided that can include one or more processors and a computer-readable storage medium containing instructions, that, when executed by the one or more processors, cause the one or more processors to perform actions. The actions can include receiving, at the master electronic device, a connection-indicative signal from an electronic accessory of the master electronic device that includes a connection attribute that is indicative of a presence or a characteristic of a connection between the electronic accessory and at least one other electronic accessory of the master electronic device. The actions can also include determining, at the master electronic device and based on the connection attribute, that an alert condition is satisfied. The actions can further include, in response to determining that the alert condition is satisfied, facilitating a presentation of an alert.

In some embodiments, a system can be provided. The system can include a transceiver module for receiving, at a master electronic device, a connection-indicative signal from an electronic accessory of the master electronic device that includes a connection attribute that is indicative of a presence or a characteristic of a connection between the electronic accessory and at least one other electronic accessory of the master electronic device. The system can also include an alert coordination module for determining, at the master electronic device and based on the connection attribute, that an alert condition is satisfied. The alert coordination module can further be for, in response to determining that the alert condition is satisfied, facilitating a presentation of an alert.

In some embodiments, a system can be provided. The system can include a master electronic device that can include one or more processors and a computer-readable storage medium containing instructions, that, when executed by the one or more processors, cause the one or more processors to perform actions. The actions can include receiving, at the master electronic device, a connection-indicative signal from an electronic accessory of the master electronic device that includes a connection attribute that is indicative of a presence or a characteristic of a connection between the electronic accessory and at least one other electronic accessory of the master electronic device. The actions can also include determining, at the master electronic device and based on the connection attribute, that an alert condition is satisfied and, in response to determining that the alert condition is satisfied, facilitating a presentation of an alert. The system can also include the electronic accessory.

In some embodiments, a computer-implemented method can be provided. A connection-indicative signal can be received at a master electronic device from an electronic accessory of the master electronic device that includes a connection attribute indicative of a characteristic of a connection between the electronic accessory and at least one other electronic accessory of the master electronic device. Location information can be estimated at the master device. The location information can be indicative of an estimated location of the at least one other electronic accessory. The estimation can be based on the connection attribute. A presentation can be presented that includes the location information.

In some embodiments, a master electronic device can be provided that can include one or more processors and a computer-readable storage medium containing instructions, that, when executed by the one or more processors, cause the one or more processors to perform actions. The actions can include receiving, at the master electronic device, a connection-indicative signal from an electronic accessory of the master electronic device that includes a connection attribute indicative of a characteristic of a connection between the electronic accessory and at least one other electronic accessory of the master electronic device. The actions can also include estimating, at the master electronic device and based on the connection attribute, location information that is indicative of an estimated location of the at least one other electronic accessory. The actions can further include presenting a presentation that includes the location information.

In some embodiments, a system can be provided. The system can include a transceiver module for receiving, at a master electronic device, a connection-indicative signal from an electronic accessory of the master electronic device that includes a connection attribute indicative of a characteristic of a connection between the electronic accessory and at least one other electronic accessory of the master electronic device. The system can also include a device director module for estimating, at the master electronic device and based on the connection attribute, location information that is indicative of an estimated location of the at least one other electronic accessory. The system can further include an interface module for presenting a presentation that includes the location information.

In some embodiments, a system can be provided. The system can include a master electronic device that can include one or more processors and a computer-readable storage medium containing instructions, that, when executed by the one or more processors, cause the one or more processors to perform actions. The actions can include receiving, at the master electronic device, a connection-indicative signal from an electronic accessory of the master electronic device that includes a connection attribute indica-tive of a characteristic of a connection between the electronic accessory and at least one other electronic accessory of the master electronic device. The actions can also include estimating, at the master electronic device and based on the connection attribute, location information that is indicative of an estimated location of the at least one other electronic accessory. The actions can further include presenting a presentation that includes the location information. The system can also include the electronic accessory.

The following detailed description together with the accompanying drawings will provide a better understanding of the nature and advantages of the present invention.

BRIEF DESCRIPTION OF THE DRAWINGS

FIG. 9 is an example of a representation of a data structure storing connection attributes pertaining to an electronic accessory of a master electronic device in accordance with an embodiment of the invention.

DETAILED DESCRIPTION

Figure 1:
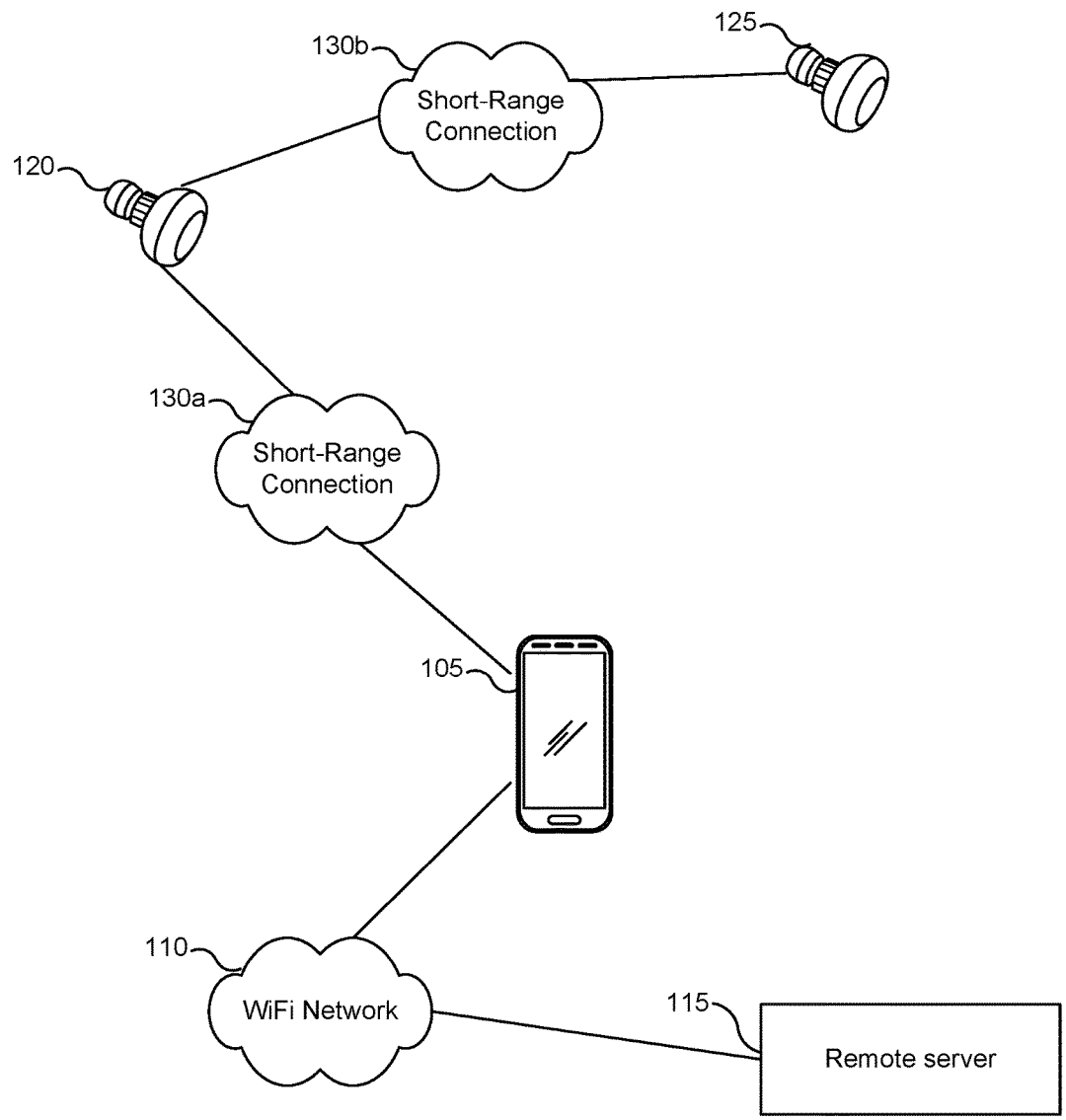
FIG. 1 illustrates an example of a master electronic device communicating with multiple electronic accessories of the master electronic device.

In certain embodiments of the present invention, a master electronic device can be configured to communicate with one or more electronic accessories (e.g., via pairing). The master electronic device can communicate directly with a first "primary" electronic accessory (e.g., via a short-range network, such as Bluetooth Low Energy (BTLE)) and indirectly with a second "secondary" electronic accessory (e.g., via the primary electronic accessory, which can communicate with the secondary electronic accessory via another short-range network, such as another BTLE network). Each of the accessories can include a speaker, earphone, headphone and/or ear bud.

The master electronic device can repeatedly identify a connection attribute indicative of a presence or characteristic (e.g., strength) of a connection between itself and the primary electronic accessory. Similarly, the primary electronic accessory can repeatedly identify a connection attribute indicative of a presence or characteristic (e.g., strength) of a connection between itself and the secondary electronic accessory and can send a connection-indicative signal with the connection attribute to the master electronic device. Thus, the master electronic device can have access to data that indirectly indicates how proximate a secondary electronic accessory is to the master electronic device, even when there is no direct connection between the secondary electronic accessory and the master electronic device. For each connection attribute (e.g., associated with either accessory), the master electronic device can detect a position of the master electronic device at a time corresponding to the connection attribute identification.

In some instances, the master electronic device can detect a weakening or weak connection attribute (e.g., identifying that a connection strength or change in connection strength is below a defined threshold). The master electronic device can then coordinate presentation of an alert (e.g., an audio alert) on the master electronic device or weakly connected accessory.

In some instances, one or more connection attributes and device positions can be stored in a data structure. When a user then provides input corresponding to a request to locate an electronic accessory, the master electronic device can use the data structure to identify a recent location of the master electronic device corresponding to a strong connection attribute (e.g., indicating that a connection with the accessory was present and/or strong) and can provide location information corresponding to the identified location. The location information can identify the location and/or can include static or dynamic directions to the location.

In some instances, a real-time connection attribute can be used to generate location information. A connection attribute can be (e.g., repeatedly) identified as a master electronic device moves. One or more connection attributes can then be used to estimate an absolute location or relative location (e.g., relative to the master electronic device) of the accessory, and the location or directions to the location can be provided.

FIG. 1 illustrates an example of a master electronic device communicating with multiple electronic accessories of the master electronic device. In this illustration, a master electronic device 105 can communicate over a network (e.g., a WiFi network 110) with one or more remote servers 115. A remote server 115 can include, for example, one hosting a server application, an email server, a web server and/or a server hosting remote storage. Master electronic device 105 can include a portable and/or hand-held electronic device, such as a smart phone, smart wearable device (e.g., a necklace, headband, clip, belt, bracelet, watch, pair of glasses, armband, or ear piece), and/or a portable electronic device for playing and/or storing digital media files (e.g., audio and/or video files).

Master electronic device 105 can be configured to perform various functions, such as coordinating play of audio and/or video files, receiving and/or sending messages (e.g., email or short message service (SMS) messages), receiving and/or initiating phone calls, accessing web pages, and/or initiating and/or coordinating a payment transfer. Master electronic device 105 can communicate with one or more electronic accessories 120 and 125 over one or more networks, such as short-range connections 130a and 130b. In some instances, one electronic accessory can be designated as a "primary" electronic accessory 120 and another electronic accessory can be designated as a "secondary" electronic accessory 125 in that some or all of communications between master electronic device 105 and secondary electronic accessory 125 are exchanged via primary electronic accessory 120. Master electronic device 105 can be paired to primary electronic accessory 120, and primary electronic accessory 120 can be paired to secondary electronic accessory 125. Thus, master electronic device 105 can directly communicate (e.g., which can include wireless communication) with primary electronic accessory 120 and can communicate with secondary electronic accessory 125 indirectly, in that another user device is involved in relaying and/or routing communications (or processed versions thereof) between the devices. In some instances, a designation of an accessory as being a primary or secondary is fixed, while in others, it can change (e.g., based on a pairing order, proximity to master device 105, and/or user input).

Electronic accessories 120 and/or 125 can include any electronic device that can coordinate with master electronic device 105 to facilitate performance of an operation. In various instances, an electronic accessory 120 and/or 125 may, or may not, be configured to perform an operation independently of a master device. For example, an electronic accessory can include an earphone that cannot play an audio file (e.g., due to a lack of storage space for audio files and/or audio-play software) without being connected to a master device to coordinate such play. One or both of primary electronic accessory 120 and secondary electronic accessory 125 can include or can be, for example, a speaker, headphone, microphone, earphone, peripheral, mouse, track pad, keyboard, wearable device (e.g., a necklace, headband, clip, belt, bracelet, watch, pair of glasses, armband, or ear piece), display, electronic case (e.g., that is configured to transmit and/or receive signals, to detect a presence of one or more electronic items in the case and/or to charge one or more electronic items) and/or phone.

In some instances, electronic accessories 120 and 125 are a same or substantially similar device type, include some or all same type of components, are capable of performing some or all of same or substantially similar types of operations, and/or are of same or substantially similar size and/or shape. In some instances, each of master electronic device and primary electronic accessory 120 and/or secondary electronic accessory 125 are associated with a same user account. For example, a pairing between primary electronic accessory 120 and master electronic device 105 can cause an identifier of primary electronic accessory 120 to be associated with a user account at master electronic device 105 or a remote server or can cause primary electronic accessory 120 to locally store an identifier of the user account. A pairing between secondary electronic accessory 125 and master electronic device 105 and/or primary electronic accessory 120 can have a similar effect.

Each of master electronic device 105 and primary electronic accessory 120 can (e.g., repeatedly) identify a connection attribute that is indicative of a presence and/or characteristic of a connection with primary electronic accessory 120 and secondary electronic accessory 125, respectively. For example, a connection attribute can indicate when any connection with the primary or secondary electronic accessory is present, a protocol of the connection (e.g., WiFi, Bluetooth, BTLE, Ultra-Wideband, WiFi-Direct, Zigbee, Universal Plug and Play, near-field communication or sound frequency), a strength of the connection, a latency of the connection, and/or a link parameter.

In some instances, the attribute-identifying device (master electronic device 105 and/or primary electronic accessory 120) can transmit the connection attribute in a connection-indicative signal to another device (e.g., master electronic device 105 can transmit the signal to remote server 115 and primary electronic accessory 120 can transmit the signal to master electronic device 105). In some instances, the attribute-identifying device (master electronic device 105 and/or primary electronic accessory 120) and/or a device receiving a connection-indicative signal with the connection attribute can store the connection attribute. The connection attribute can be stored in association with a time and/or location (e.g., an estimated location of the attribute-identifying device and/or device receiving a connection-indicative signal).

Identifications and/or relaying of connection attributes can facilitate preventing loss or theft of an electronic accessory and/or can facilitate locating an electronic accessory. For example, an alert condition can be defined to detect a weak or weakening connection, such as by detecting a lack of a connection (generally or using a particular protocol), a connection strength or link parameter (or change in strength or parameter) below a defined threshold, or a connection latency (or change in latency) above a defined threshold. The condition can be assessed by (for example) by master electronic device 105, and satisfaction of the condition can facilitate presentation of an alert (e.g., an audio alert) at the master electronic device 105, primary electronic accessory 120 and/or secondary electronic accessory 125.

As another example, a connection attribute can be used to provide a user with location information for an accessory. In one instance, upon detecting a locate-accessory request input, master electronic device 105 can identify a recent connection attribute associated with the accessory, such as a most recent attribute indicating that a connection existed with the accessory, that a strength or link parameter of a connection with the accessory was above a threshold or at a local maximum or a latency of a connection with the accessory was below a threshold or at a local minimum. Master electronic device 105 can identify location associated with the identified connection attribute (e.g., an estimated location of master electronic device 105 at a time corresponding to an identification of the connection attribute) and can provide location information corresponding to the location (e.g., by identifying the location or providing directions to the location).

In one instance, master electronic device 105 can generate and present location information based on a real-time connection attribute. For example, master electronic device 105 can detect whether a connection attribute is improving or degrading (e.g., whether a connection strength is increasing or decreasing) as the device is moved and can provide directions accordingly.

Transmitting connection-indicative signals with connection attributes can enable indirect tracking capabilities. Indirect tracking can be useful, for example, both when one device is not configured to directly communicate with another device and/or when one device is unable to successfully communicate with the other device (e.g., due to a large distance separation).

Figure 2:
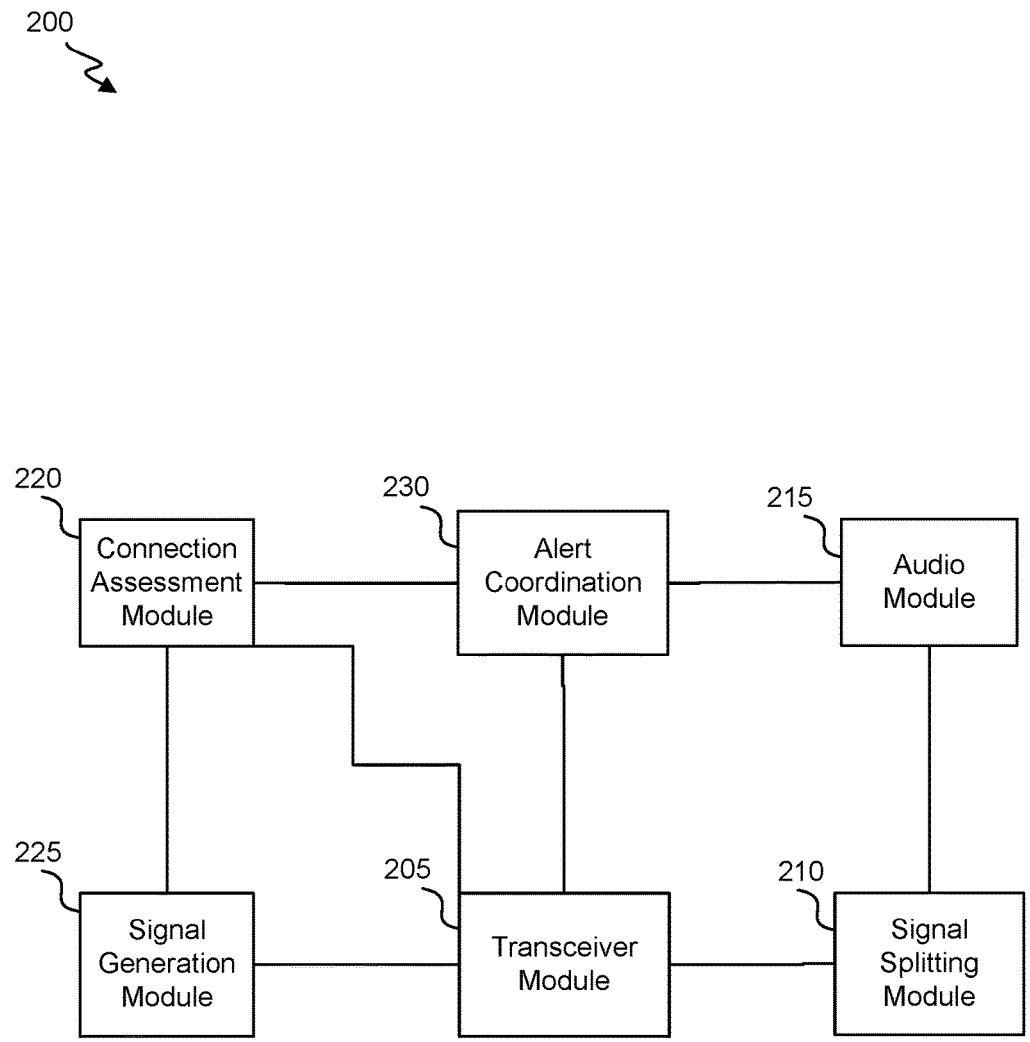
FIG. 2 is a simplified block diagram of an electronic accessory according to an embodiment of the present invention.

FIG. 2 is a simplified block diagram of an electronic accessory 200 (e.g., a primary electronic accessory 120) according to an embodiment of the present invention. Electronic accessory 200 can include a transceiver module 205 to (e.g., wirelessly) receive and/or send communications to one or more other devices (e.g., master electronic device 105 and/or secondary electronic accessory 125). Transceiver module 205 can be configured to receive and/or send communications using a particular protocol, such as a WiFi, Bluetooth, BTLE, Ultra-Wideband, WiFi-Direct, Zigbee, Universal Plug and Play, near-field communication or sound frequency protocol. It will be appreciated that, in some instances, transceiver module 205 can include multiple transceiver sub-modules. For example, different transceiver sub-modules can be configured to use different protocols. Transceiver module 205 can include, for example, an antenna, a Bluetooth transceiver, and/or an inductor. It will also be appreciated that transceiver module 205 can include one or more receiver modules and/or one or more transmitter modules.

Transceiver module 205 can receive a multi-channel operation signal from a master electronic device. A signal splitting module 210 can extract at least one channel from the signal. For example, a multi-channel operation signal can include data for each of multiple accessories and/or a primary and a secondary channel. In a particular illustration, a multi-channel operation signal can include two audio channels (e.g., a "right" channel and a "left" channel). Data from one extracted channel (e.g., a primary channel) can be availed to a corresponding operation module, such as an audio module 215. The operation module can then perform an operation based on the channel data. For example, audio module 215 can play an audio signal corresponding to the one extracted channel.

Remaining data can be relayed (via a transceiver module) to at least one other electronic accessory. In some instances, the multi-channel operation signal (e.g., including all channels) is relayed to the other electronic accessory. In some instances, another channel (e.g., a secondary channel) is extracted from the multi-channel signal and sent (e.g., in a single-channel signal) to the other electronic accessory. The other electronic accessory can then perform an operation based on data in the other channel (e.g., such that the electronic accessory and other electronic accessory play complementary audio data).

Electronic accessory 200 can also include a connection assessment module 220 that identifies a connection attribute pertaining to another device (e.g., an other electronic accessory). For example, a connection attribute can indicate whether electronic accessory 200 is at all able to communicate with the other device, is paired with the other device or able to communicate with the other device using a particular protocol (e.g., BTLE, Bluetooth or another short-range protocol). As another example, a connection attribute can identify a characteristic of an existing connection with the other device (e.g., a connection strength, latency, protocol or link parameter). As yet another example, a connection attribute can identify a change in a connection, such as a disconnection, a connection, or an increase or decrease in a connection characteristic.

In some instances, connection assessment module 220 can repeatedly identify a connection attribute. For example, a connection attribute pertaining to a given device can be identified at regular time intervals, at defined times, and/or upon detecting an event (e.g., a failed communication transmission or an incoming communication).

A signal generation module 225 can generate a connection-indicative signal to include the identified connection attribute. The connection-indicative signal can also include, for example, a time and an identifier of the device corresponding to the connection attribute. A connection-indicative signal can be generated, e.g., upon identification of a connection attribute, at a defined time, or at a completion of a defined time period. In one instance, signal generation module 225 regularly transmits a connection-indicative signal that includes an identification of each other device having a particular connection attribute (e.g., identifying each device in communication with electronic accessory 200, identifying each paired device in communication with electronic accessory 200 over a short-range network, identifying each device associated with a particular user account in communication with electronic accessory 200 and having an above-threshold connection strength). In such instances, a lack of an identification of a device in a connection-indicative signal can itself correspond to a connection attribute.

The connection-indicative signal can be transmitted, by transceiver module 205, to a master electronic device (e.g., via a short-range connection). Because connection attributes can depend on device separation distances, the signal can be used to estimate when electronic accessory 200 is becoming or is geographically separated from another device (e.g., another accessory). When a short-range connection between electronic accessory 200 and a device receiving the connection-indicative signal is strong, a connection attribute pertaining to a connection between electronic accessory 200 and another device can also be correlated with a separation distance between a signal-receiving device and the other device.

Electronic accessory 200 can also include an alert coordination module 230 that can, for example, initiate a presentation of an alert and/or handle an alert-instruction signal. In one instance, alert coordination module 230 detects, based on an identified connection attribute, that an alert condition is satisfied. For example, a previous connection may be disconnected or a strength of a connection can be below a threshold. Alert coordination module can then, for example, generate an alert-instruction signal to be sent by transceiver module 205 to a master electronic device or device pertaining to the connection attribute and/or can cause audio module 215 (or another module, such as a visual interface module or haptic module) to present an alert.

In some instances, alert coordination module 230 detects an incoming alert-instruction signal (e.g., from a master electronic device). An alert-instruction signal can correspond to an instruction to electronic accessory 200 to present an alert and/or to transmit (e.g., relay) an alert-instruction signal to another device (e.g., another accessory).

Alert coordination module 230 can further coordinate to communicate a position of a device to facilitate a determination as to whether an alert is to be positioned. Transceiver module 205 can receive a position-identifying signal from an other electronic accessory that identifies a positional characteristic of the other electronic accessory. For example, using one or more proximity detectors, the other electronic accessory can estimate as to whether it is positioned within a person's ear and communicate the estimation via the position-identifying signal. In some instances, alert coordination module 230 can request such a signal, for example, upon receiving an alarm-instruction signal and/or a locate-accessory signal (e.g., from a master electronic device) or at routine time intervals.

In some instances, upon receiving the position-identifying signal, alert coordination module 230 can transmit a relayed position-identifying signal (e.g., that is also indicative of the positional characteristic) to a master electronic device and/or one controlling alert initiation. In some instances, alert coordination module 230 controls transmission of an alert-instruction signal based on the positional characteristic. For example, alert coordination module 230 can initiate transmission of an alert-instruction signal to the other electronic accessory when the positional characteristic indicates that the other electronic accessory is not in a person's ear and/or can inhibit transmission of an alert-instruction signal when the positional characteristic indicates that the other electronic accessory is in a person's ear.

Figure 3:
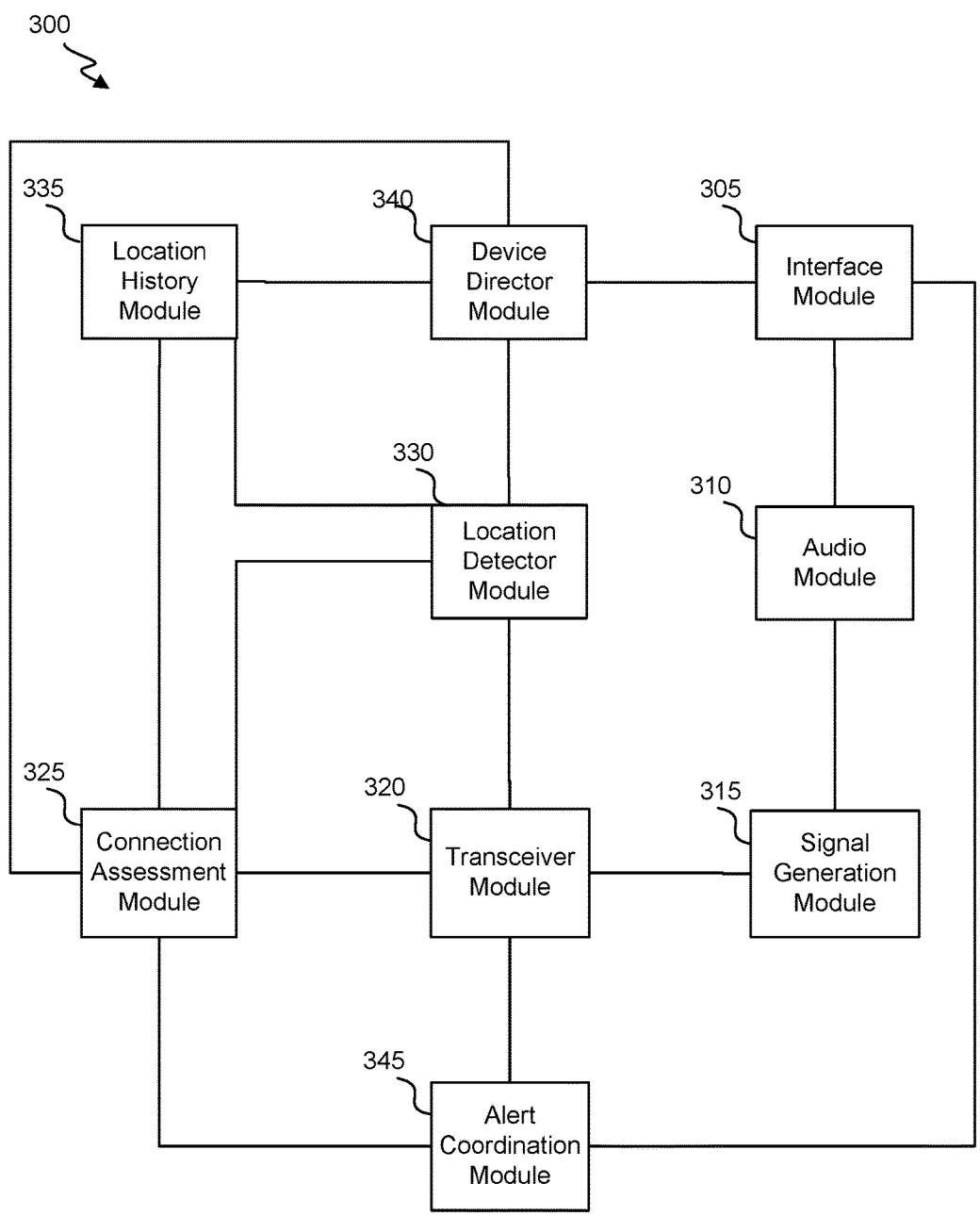
FIG. 3 is a simplified block diagram of a master electronic device according to an embodiment of the present invention.

FIG. 3 is a simplified block diagram of a master electronic device 300 (e.g., master electronic device 105) according to an embodiment of the present invention. Master electronic device 300 can include an interface module 305 that can detect user inputs and/or present outputs. A user input can correspond to a request that master electronic device 300 perform a function, such as to execute an app on device 300, access a webpage, access a stored file, or facilitate a communication (e.g., via a phone call, chat or message).

In one instance, an input can correspond to a request to play an audio file, such as a file stored locally at master electronic device 300 or a file stored at a remote source. An audio module 310 can identify the file (e.g., based on an identification provided via the input and/or a selection technique), can access the file (e.g., by retrieving it from storage, streaming the file from a remote source or requesting the file from a remote source for download) and initiate play of the file.

In one instance, an input can correspond to a request to participate in a phone conversation (e.g., to initiate a new phone conversation and/or to answer an incoming call). A phone module (not shown) can coordinate an inter-device connection to establish and/or maintain the call, and audio module 310 can facilitate presentation of audio signals received as part of the call.

In some instances, master electronic device 300 can use one or more electronic accessories to facilitate in performing a function (e.g., one requested via user input). A signal generation module 315 can generate a master-device operation signal that includes data indicative of one or more actions requested to be performed at each of one or more electronic accessories. The master-device operation signal can include, for example, an identifier of an app, part or all of a file, an audio signal, an identification of a task, and/or an initiation and/or completion time. For example, the master-device operation signal can include part or all of an audio file or audio data from a call.

In some instances, the master-device operation signal includes multiple portions, where a different receiving device can use a different portion. For example, a master-device signal can include two channels for audio data. Each channel can correspond to a "right" or "left" channel to be presented (for example) by a corresponding accessory positioned on a respective side of a user. Channels can be complementary, similar or the same. For example, if stereo data is not available for audio data, two channels may be identical.

Signal generation module may include an indication in a master-device operation signal as to which receiving device is to handle a particular portion of the signal. For example, when a signal includes two channels, the master-device operation signal can identify one of the signals as a "right" channel such that it can be handled by a "right" accessory and another as a "left" channel such that it can be handled by a "left" accessory. As another example, one channel can be designated as a "primary" channel to be handled by a receiving device and another as a "secondary" channel to be transmitted from the receiving device to another device.

Master electronic device 300 can include a transceiver module 320 to (e.g., wirelessly) receive and/or send communications to one or more other devices (e.g., primary electronic accessory 120 and/or secondary electronic accessory 125). Transceiver module 320 can transmit one or more master-device operation signals to an electronic accessory (e.g., one paired to master electronic device 300). The transmission can be discrete or continuous.

Transceiver module 320 can be configured to receive and/or send communications using a particular protocol, such as a WiFi, Bluetooth, BTLE, Ultra-Wideband, WiFi-Direct, Zigbee, Universal Plug and Play, near-field communication or sound frequency protocol. It will be appreciated that, in some instances, transceiver module 320 can include multiple transceiver sub-modules. For example, different transceiver sub-modules can be configured to use different protocols. Transceiver module 320 can include, for example, an antenna, a Bluetooth transceiver, and/or an inductor. It will be appreciated that transceiver module 205 can include one or more receiver modules and/or one or more transmitter modules.

Master electronic device 300 can include a connection assessment module 325, which can perform similar functions and have similar configurations as connection assessment module 220 in electronic accessory 200. Connection assessment module 325 can identify a connection attribute pertaining to another device (e.g., an electronic accessory). For example, a connection attribute can indicate whether master electronic device 300 is at all able to communicate with the other device, is paired with the other device or able to communicate with the other device using a particular protocol (e.g., BTLE, Bluetooth or another short-range protocol). As another example, a connection attribute can identify a characteristic of an existing connection with the other device (e.g., a connection strength, latency, protocol or link parameter). As yet another example, a connection attribute can identify a change in a connection, such as a disconnection, a connection, or an increase or decrease in a connection characteristic.

In some instances, connection assessment module 220 can repeatedly identify a connection attribute. For example, a connection attribute pertaining to a given device can be identified at regular time intervals, at defined times, and/or upon detecting an event (e.g., a failed communication transmission or an incoming communication).

In some instances, connection assessment module can also analyze a connection-indicative signal received via transceiver module 320. For example, a connection-indicative signal can be received from an electronic accessory that is indicative of a presence or characteristic of a connection between the electronic accessory and an other electronic accessory.

Connection assessment module 325 can respond to some or all connection attributes (e.g., locally identified or included in a received connection-indicative signal) by initiating an estimation of a location of master electronic device 300. For example, the location can be estimated upon detecting a change (or a change of at least a threshold degree) in a connection attribute, for detecting a connection attribute indicative of a new connection or disconnection, and/or for detecting a connection attribute that exceeds a defined threshold.

The location of master electronic device 300 can be estimated by a location detector module 330. Location detector module 330 can estimate a location of master electronic device 300 by analyzing signals received from one or more sources with known locations, such as GPS satellites or WiFi access points. Location detector module 330 can use a strength and/or latency of a signal in the location estimation and can use a triangulation technique. An estimated location can include, for example, geographic coordinates, a functional location (e.g., at "Home"), or an address.

In some instances, location detector module 330 routinely estimates location of master electronic device 300. In some instances, the location is estimated only upon receiving a request (e.g., from connection assessment module 325) or detecting a particular event.

A location history module 335 can store one or more estimated locations. An estimated location can be stored in association with one or more connection attributes and/or one or more times. For example, location history module 335 can store data indicating that master electronic device 300 was estimated to be at Location X, at Time Y, and that at approximately that time, master electronic device 300 was connected to Electronic Accessory A, but Electronic Accessory A was not connected to any other electronic accessories.

Location history module 335 can maintain a data structure with the estimated locations so as to add new data in a replacement and/or addition manner. For example, each new location (e.g., and any associated information) can be concatenated to an existing structure. As another example, addition of a new estimated location (e.g., and any associated information) can result in a removal of another estimated location in an existing structure (e.g., an oldest estimated location or one corresponding to a similar or same connection attribute as the new estimated location). As another example, estimated locations can be removed from an existing structure according to a technique independent of structure additions (e.g., clearing all estimated locations having been added more than a threshold time ago).

In some instances, master electronic device 300 can be connected to a secondary electronic accessory via a primary electronic accessory. Connection-indicative signals can indicate when the secondary electronic accessory is connected to the primary electronic accessory (e.g., via a short-range network). Accordingly, if the secondary electronic accessory is dropped or forgotten, identifying a location of the primary electronic accessory at various times can provide an indication as to where the secondary electronic accessory may later be retrieved. In some instances, the primary electronic accessory also includes a location detector module and can transmit its estimated location via a connection-indicative signal or other signal. In some instances, a location of master electronic device 300 can instead be used (e.g., as a proxy for a location of the primary electronic accessory), such that the primary electronic accessory need not even have the capability of identifying its location. This may be particularly advantageous when the master electronic device 300 is connected to the primary electronic accessory via a short-range connection.

A device director module 340 can use stored device location estimations to generate location information pertaining to a "target" device. A target device can include, for example, a device identified via user input (e.g., in a locate-accessory request) or a device associated with a weak or weakening connection attribute (e.g., as defined by a condition). A target device can include an electronic accessory, such as a primary electronic accessory or secondary electronic accessory.

In one instance, interface module 305 receives a request to locate an accessory. Device director module 340 can then access stored data to identify a recent (e.g., most recent) estimated location for the accessory. For example, the location can include a most recent location corresponding to a connection attribute above a threshold, identifying an existing connection or identifying an active pairing. As another example, the location can include a location corresponding to a connection attribute with a maximum value across a time period and/or with a local maximum.

Location information can include the estimated location and/or a processed version thereof. For example, device director module 340 can convert geographic coordinates into an address and/or location name (e.g., "Mike's Deli"), and/or device director module 340 can generate a graphical representation (e.g., on a map) that identifies the estimated location. Device director module 340 can coordinate presentation of the location information via interface module 305. The presentation can also include other corresponding data, such as a time associated with the estimated location (e.g., "Accessory B last detected at Position X at Time Y").

Location information can also or alternatively include directions to the estimated location. A starting location to use for the direction can include a current or recent location of master electronic device 300 detected by location detector module 330 and/or one provided via user input. Device director module 340 can facilitate presentation of the directions via, for example, a map, an audio sequence (e.g., "Turn right on $1^{st}$ street and walk 300 ft") or a written sequence. In some instances, directions can be provided in a non-verbal manner, such as by controlling a frequency or volume of a pulsed tone based on a separation distance between master electronic device 300 and a target device.

Directions can be static or dynamic. Dynamic directions can change based on, for example, an updated estimated location of master electronic device 300 and/or newly received connection attributes.

Additionally or alternatively, device director module 340 can generate initial or updated location information based on a connection attribute included in one or more connection-indicative signals and/or identified at device 300. For example, device director module 340 can determine how a connection attribute is varying as master electronic device 300 is moving along a particular direction and can adjust its directions accordingly.

Master electronic device 300 can also include an alert coordination module 345 that can, for example, initiate a presentation of a local and/or remote alert. In one instance, alert coordination module 345 detects, based on an identified connection attribute and/or input, that an alert condition is satisfied. For example, it can be detected that a previous connection (e.g., between master electronic device 300 and an electronic accessory or between two accessories) has been disconnected or a strength of a connection is below a threshold. Alert coordination module 345 can then, for example, generate an alert-instruction signal to be sent by transceiver module 320 to an electronic accessory (e.g., a primary and/or secondary electronic accessory). As another example, a locate-accessory request identifying a particular accessory can be detected by interface module 305, and alert coordination module 345 can then generate an alert-instruction signal to be sent to the particular accessory.

In some instances, before or after an alert-instruction signal is transmitted, a position-identifying signal is received that is indicative of a position of an electronic accessory (e.g., that is a target accessory, an accessory identified via a locate-accessory request input and/or one that is identified to present an alert). For example, if a locate-accessory request is received and identifies a secondary electronic accessory, alert coordination module 345 can transmit an indication of the request to a primary electronic accessory, which can then request a positional characteristic (e.g., an indication as to whether it is estimated that the secondary electronic accessory is in a person's ear) from the secondary electronic accessory.

In some instances, a positional characteristic can automatically influence an alert presentation. For example, if it is estimated that an electronic accessory is in a person's ear, an alert that would have otherwise been presented via the accessory can be partly or completely suppressed (e.g., not presented or presented at a reduced intensity, such as a reduced volume). In some instances, alert coordination module 345 can cause an identification of an estimated position to be presented via interface module 305. The position identification can be presented with an option to continue (or abandon) an alert. For example, if it is estimated that an electronic accessory is in a person's ear, interface module 305 can present "Accessory being worn. Continue with audio alert?". Alert coordination module 345 can then send one or more communications to reflect a responsive input or a default action (e.g., suppress alert when accessory being worn unless contrary user input is received).

Figure 4:
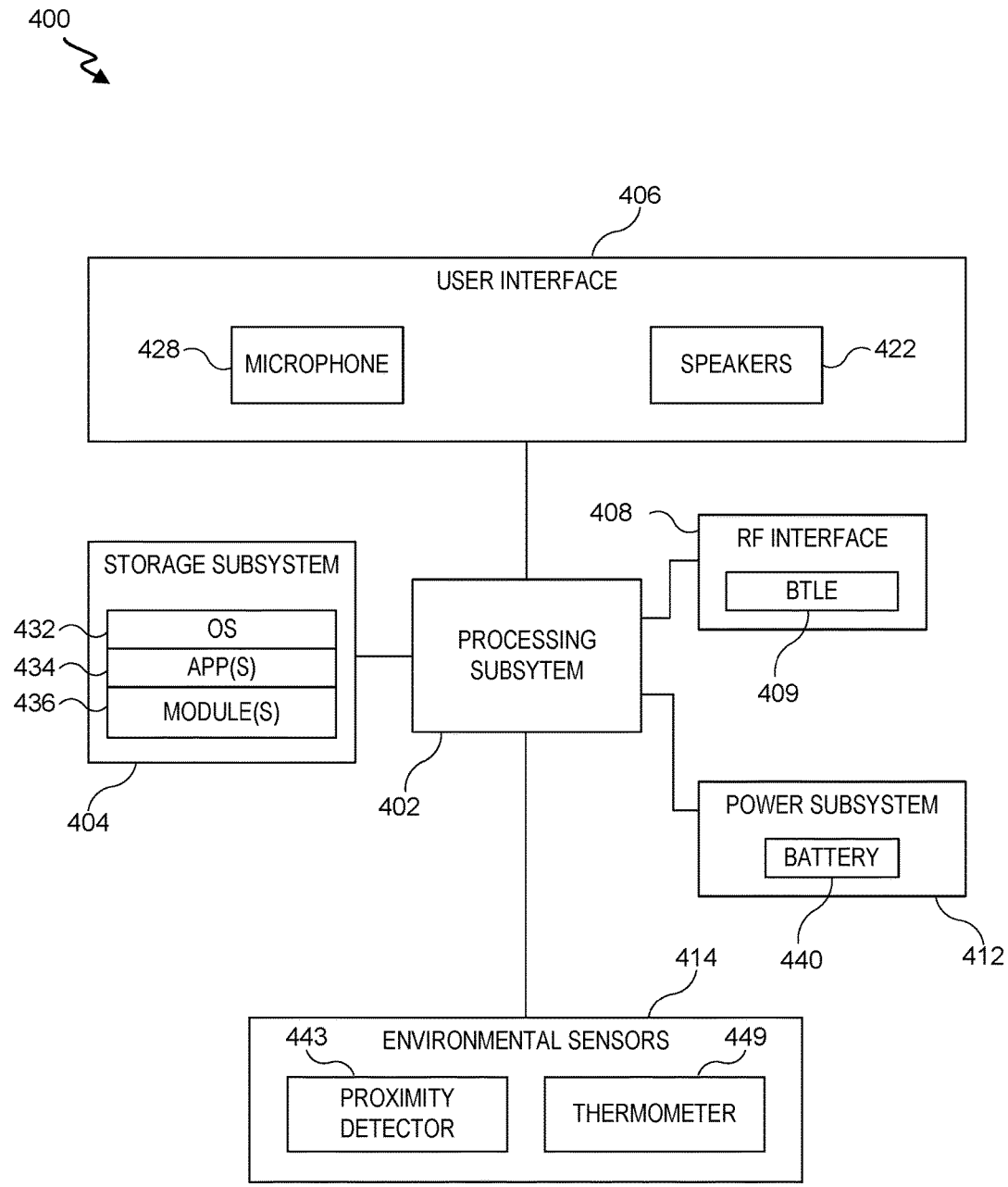
FIG. 4 is an example schematic diagram of an electronic accessory according to an embodiment of the present invention.

FIG. 4 is an example schematic diagram of an electronic accessory 400 (e.g., a primary or secondary electronic accessory and/or electronic accessory 120, 125 and/or 200) according to an embodiment of the present invention. Electronic accessory 400 can include processing subsystem 402, storage subsystem 404, user interface 406, one or more connection components (e.g., RF interface 408 and/or connector interface 410), power subsystem 412, and environmental sensors 414. Electronic accessory 400 can also include other components (not explicitly shown).

Storage subsystem 404 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 404 can store media items such as audio files, video files, image or artwork files; information about a user's contacts (names, addresses, phone numbers, etc.); appointments and events; notes; and/or other types of information, examples of which are described below. In some embodiments, storage subsystem 404 can also store one or more application programs (or apps) 434 to be executed by processing subsystem 402 (e.g., video game programs, personal information management programs, media playback programs, interface programs associated with particular host devices and/or host device functionalities, etc.).

User interface 406 can include any combination of input and output devices. In some instances, a user can operate input devices of user interface 406 to invoke the functionality of electronic accessory 400 and/or a connected (e.g., indirectly or directly) master electronic device and can view, hear, and/or otherwise experience output from electronic accessory 400 and/or a connected (e.g., indirectly or directly) master electronic device via output devices of user interface 406.

An example of an output device include speakers 422. One or more speakers 421 can be provided using small-form-factor speaker technologies, including any technology capable of converting electronic signals into audible sound waves. In some embodiments, speakers 421 can be used to produce tones (e.g., beeping or ringing) and can but need not be capable of reproducing sounds such as speech or music with any particular degree of fidelity.

An example of an input device can include a microphone 428. Microphone 428 can include any device that converts sound waves into electronic signals. In some embodiments, microphone 428 can be sufficiently sensitive to provide a representation of specific words spoken by a user; in other embodiments, microphone 428 can be usable to provide indications of general ambient sound levels without necessarily providing a high quality electronic representation of specific sounds.

Processing subsystem 402 can be implemented as one or more integrated circuits, e.g., one or more single-core or multi-core microprocessors or microcontrollers, examples of which are known in the art. In operation, processing system 402 can control the operation of electronic accessory 400. In various embodiments, processing subsystem 404 can execute a variety of programs in response to program code and can maintain multiple concurrently executing programs or processes. At any given time, some or all of the program code to be executed can be resident in processing subsystem 404 and/or in storage media such as storage subsystem 404.

Through suitable programming, processing subsystem 402 can provide various functionality for electronic accessory 400. For example, in some embodiments, processing subsystem 402 can execute an operating system (OS) 432 and various applications 434 such as a media-playing application, media-streaming application, and/or other applications. In some embodiments, some or all of these application programs can interact with a master electronic device, e.g., by receiving audio data to play. In some embodiments, some or all of the application programs can operate locally to electronic accessory 400.

Processing subsystem 402 can also execute a code for one or more components of device 400. For example, processing subsystem 402 can execute a module code 436 (which can be part of OS 432 or separate as desired) for each of one or more modules (e.g., modules identified in FIG. 2), each of one or more parts of modules, and/or each of one or more combinations of modules or parts thereof. Execution of one or more module codes 436 can, for example, identify a connection attribute that is indicative of a presence or characteristic of another electronic accessory, transmit the connection attribute to a master electronic device (e.g., via a connection-indicative signal) and/or coordinate presentation of an alert.

RF (radio frequency) interface 408 can allow electronic accessory 400 to communicate wirelessly with various devices (e.g., a master electronic device, other electronic accessory or other device). RF interface 408 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, RF interface 408 can implement a Bluetooth LE (Low energy) proximity sensor 409 that supports proximity detection through an estimation of signal strength and/or other protocols for determining proximity to another electronic device.

In some embodiments, RF interface 408 can provide near field communication ("NFC") capability, e.g., implementing the ISO/IEC 18092 standards or the like; NFC can support wireless data exchange between devices over a very short range (e.g., 20 centimeters or less). RF interface 408 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 408.

In some embodiments, RF interface 408 can be used to support synchronization operations in which data is transferred from a another device (e.g., a master electronic device or other electronic accessory) to electronic accessory 400 (or vice versa). For example, a user can be able to customize settings and other information for electronic accessory 400. While user interface 406 may (in some embodiments) support data entry operations, a user can find it more convenient to define customized information on a separate device (e.g., a tablet or smartphone) that has a larger interface (e.g., including a real or virtual alphanumeric keyboard) and/or additional user interface components, then transfer the customized information to electronic accessory 400 via a synchronization operation. Synchronization operations can also be used to load and/or update other types of data in storage subsystem 404, such as media items, application programs, personal data, and/or operating system programs. Synchronization operations can be performed in response to an explicit user request and/or automatically, e.g., when electronic accessory 400 resumes communication with a particular master electronic device or in response to either device receiving an update to its copy of synchronized information.

Environmental sensors 414 can include various electronic, mechanical, electromechanical, optical, or other devices that provide information related to external conditions around electronic accessory 400. Sensors 414 in some embodiments can provide digital signals to processing subsystem 402, e.g., on a streaming basis or in response to polling by processing subsystem 402 as desired. Any type and combination of environmental sensors can be used; shown by way of example are a proximity detector 443 and a thermometer 449.

Some environmental sensors can provide information about the location and/or motion of electronic accessory 400. For example, proximity detector 443 can sense a distance from a nearby object (e.g., in each of one or more directions). Proximity detector 443 can include, for example, a photoelectric sensor and/or emitter such that it can use light to detect a proximity of an object; and/or an acoustic sensor and/or emitter such that it can use sound to detect a proximity of an object. As another example, a thermometer can detect an ambient temperature (e.g., which may be influenced by whether electronic accessory 400 is being worn). Other sensors can also be included in addition to or instead of these examples.

Power subsystem 412 can provide power and power management capabilities for electronic accessory 400. For example, power subsystem 412 can include a battery 440 (e.g., a rechargeable battery) and associated circuitry to distribute power from battery 440 to other components of electronic accessory 400 that require electrical power. In some embodiments, power subsystem 412 can also include circuitry operable to charge battery 440, e.g., when connector interface 410 is connected to a power source. In some embodiments, power subsystem 412 can include a "wireless" charger, such as an inductive charger, to charge battery 440 without relying on connector interface 410. In some embodiments, power subsystem 412 can also include other power sources, such as a solar cell, in addition to or instead of battery 440.

In some embodiments, power subsystem 412 can control power distribution to components within electronic accessory 400 to manage power consumption efficiently. For example, power subsystem 412 can automatically place device 400 into a "hibernation" state when sensors 414 detect indications accessory 400 is not being worn. The hibernation state can be designed to reduce power consumption; accordingly, user interface 406 (or components thereof), RF interface 408 can be powered down (e.g., to a low-power state or turned off entirely), while other components (e.g., one or more environmental sensors 414) are powered up (either continuously or at intervals) to detect changed environmental stimuli.

Power subsystem 412 can also provide other power management capabilities, such as regulating power consumption of other components of electronic accessory 400 based on the source and amount of available power, monitoring stored power in battery 440, generating user alerts if the stored power drops below a minimum level, and so on.

In some embodiments, control functions of power subsystem 412 can be implemented using programmable or controllable circuits operating in response to control signals generated by processing subsystem 402 in response to program code executing thereon, or as a separate microprocessor or microcontroller. In some embodiments, control functions of power subsystem 412 can be based on user interaction with the device (e.g., to power down components if a device has not been interacted with in a particular manner, such as via a touch, button press or network activity, for a defined period of time).

It will be appreciated that electronic accessory 400 is illustrative and that variations and modifications are possible. For example, electronic accessory 400 can include additional user interface components, such as a display and/or haptic output. As another example, electronic accessory 400 can include an additional environmental sensor, such as an accelerometer and/or gyroscope to detect a position of electronic accessory 400. Electronic accessory 400 can include any types and combination of sensors and in some instances can include multiple sensors of a given type. As yet another example, electronic accessory 400 can include a connector interface to receive a wired connection to connect to another device and/or a wired power connection, e.g., for charging a battery of the electronic accessory.

Further, while the electronic accessory is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 4 be implemented in a given embodiment of a electronic accessory. For example, whether a component is included in electronic accessory 400 and/or a function of a component of electronic accessory 400 can depend on whether the accessory is a primary or secondary accessory. For example, in some instances, a secondary electronic accessory may include a proximity detector 443 while a primary electronic accessory need not.

Figure 5:
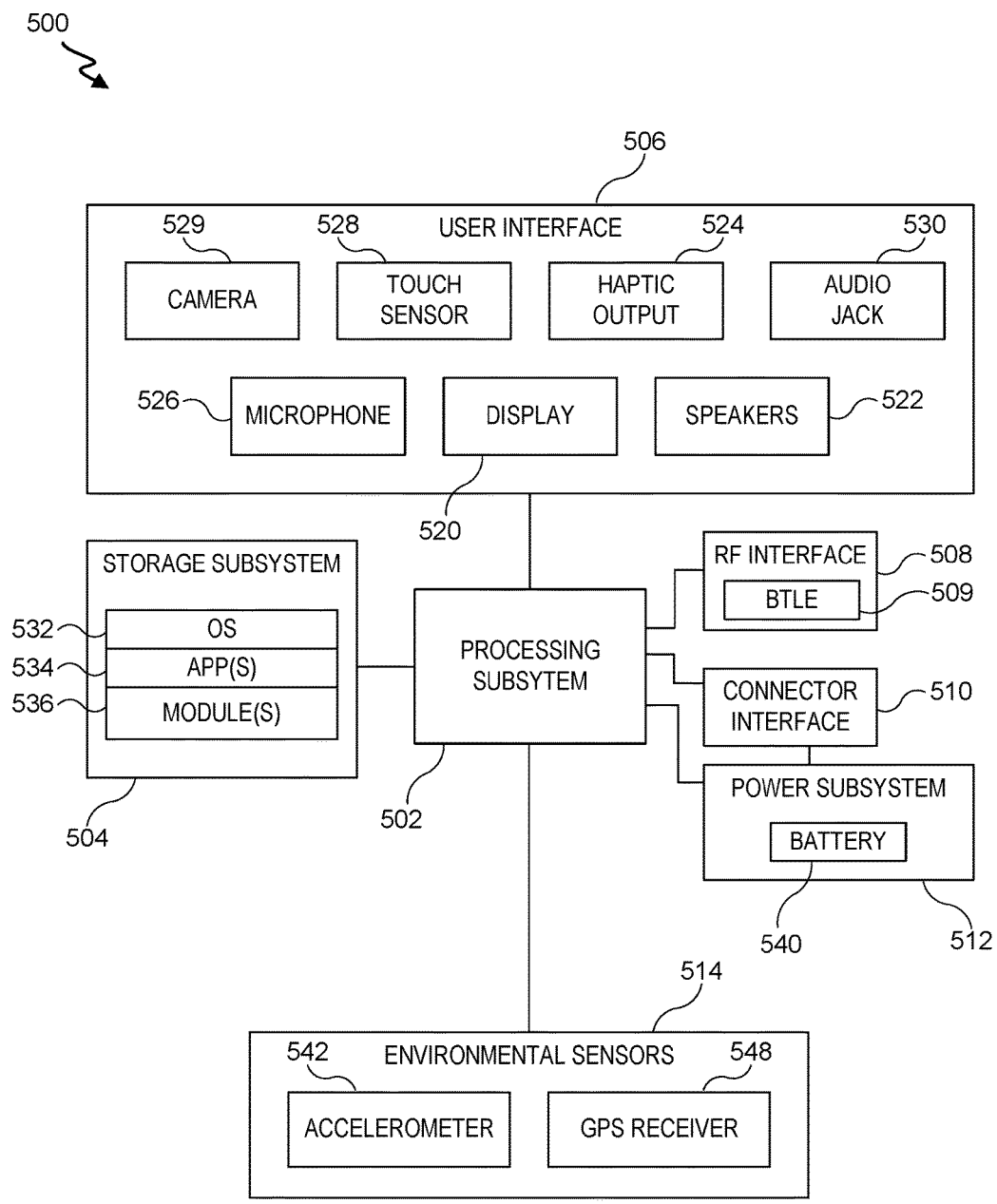
FIG. 5 is an example schematic diagram of a master electronic device according to an embodiment of the present invention.

FIG. 5 is an example schematic diagram of a master electronic device 500 (e.g., master electronic device 105 and/or 300) according to an embodiment of the present invention. Master electronic device 500 can include processing subsystem 502, storage subsystem 504, user interface 506, RF interface 508, connector interface 510, power subsystem 512, and environmental sensors 514. Master electronic device 500 can also include other components (not explicitly shown). Many of the components of master electronic device 500 can be similar or identical to those of electronic accessory 400 of FIG. 4.

For instance, storage subsystem 504 can be generally similar to storage subsystem 404 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 404, storage subsystem 504 can be used to store data and/or program code to be executed by processing subsystem 502.

User interface 506 can include any combination of input and output devices. A user can operate input devices of user interface 506 to invoke the functionality of master electronic device 500 and can view, hear, and/or otherwise experience output from master electronic device 500 via output devices of user interface 506. Examples of output devices include display 520, speakers 522, and haptic output generator 524. Examples of input devices include microphone 526, touch sensor 528, and camera 529. These input and output devices can be similar to output devices described above with reference to FIG. 5.

Display 520 can be implemented using compact display technologies, e.g., LCD (liquid crystal display), LED (light-emitting diode), OLED (organic light-emitting diode), or the like. In some embodiments, display 520 can incorporate a flexible display element or curved-glass display element, allowing master electronic device 500 to conform to a desired shape. One or more speakers 522 can be provided using small-form-factor speaker technologies, including any technology capable of converting electronic signals into audible sound waves. In some embodiments, speakers 522 can be used to produce tones (e.g., beeping or ringing) and can but need not be capable of reproducing sounds such as speech or music with any particular degree of fidelity. Haptic output generator 524 can be, e.g., a device that converts electronic signals into vibrations; in some embodiments, the vibrations can be strong enough to be felt by a user wearing master electronic device 500 but not so strong as to produce distinct sounds.

Touch sensor 528 can include, e.g., a capacitive sensor array with the ability to localize contacts to a particular point or region on the surface of the sensor and in some instances, the ability to distinguish multiple simultaneous contacts. In some embodiments, touch sensor 528 can be overlaid over display 520 to provide a touchscreen interface, and processing subsystem 504 can translate touch events (including taps and/or other gestures made with one or more contacts) into specific user inputs depending on what is currently displayed on display 520.

Camera 529 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 504 and/or transmitted by master electronic device 500 to other devices for storage. Depending on implementation, the optical components can provide fixed focal distance or variable focal distance; in the latter case, autofocus can be provided. In some embodiments, camera 527 can be disposed along an edge of a face member of a device, e.g., the top edge, and oriented to allow a user to capture images of nearby objects in the environment such as a bar code or QR code. In other embodiments, camera 529 can be disposed on the front surface of a device face member, e.g., to capture images of the user. Zero, one, or more cameras can be provided, depending on implementation.

Microphone 526 can include any device that converts sound waves into electronic signals. In some embodiments, microphone 526 can be sufficiently sensitive to provide a representation of specific words spoken by a user; in other embodiments, microphone 526 can be usable to provide indications of general ambient sound levels without necessarily providing a high-quality electronic representation of specific sounds.

In some embodiments, user interface 506 can provide output to and/or receive input from an auxiliary device such as a headset. For example, audio jack 530 can connect via an audio cable (e.g., a standard 2.5-mm or 3.5-mm audio cable) to an auxiliary device. Audio jack 530 can include input and/or output paths. Accordingly, audio jack 530 can provide audio to the auxiliary device and/or receive audio from the auxiliary device. In some embodiments, a wireless connection interface can be used to communicate with an auxiliary device.

Processing subsystem 502 can be implemented as one or more integrated circuits, e.g., one or more single-core or multi-core microprocessors or microcontrollers, examples of which are known in the art. In operation, processing system 502 can control the operation of master electronic device 500. In various embodiments, processing subsystem 502 can execute a variety of programs in response to program code and can maintain multiple concurrently executing programs or processes. At any given time, some or all of the program code to be executed can be resident in processing subsystem 502 and/or in storage media such as storage subsystem 504.

Through suitable programming, processing subsystem 502 can provide various functionality for master electronic device 500. For example, in some embodiments, processing subsystem 502 can execute an operating system (OS) 532 and various applications 534 such as a phone-interface application, a text-message-interface application, a media interface application, a fitness application, and/or other applications. In some embodiments, some or all of these application programs can interact with one or more electronic accessories, e.g., by generating messages or signals (e.g., with audio signals) to be sent to an accessory and/or by receiving and interpreting messages or signals (e.g., with audio signals) from the accessory. In some embodiments, some or all of the application programs can operate locally on master electronic device 500.

Processing subsystem 502 can also execute a code for one or more components of device 500. For example, processing subsystem 502 can execute a module code 536 (which can be part of OS 532 or separate as desired) for each of one or more modules (e.g., modules identified in FIG. 3), each of one or more parts of modules, and/or each of one or more combinations of modules or parts thereof. Execution of one or more module codes 536 can, for example, identify a connection attribute that is indicative of a presence or characteristic of an electronic accessory, receive and process a connection attribute from an electronic accessory, (e.g., via a connection-indicative signal), estimate a location of master electronic device 500, store data (e.g., a connection attribute and/or device location), process a locate-accessory request, and/or coordinate presentation of an alert.

RF (radio frequency) interface 508 can allow master electronic device 500 to communicate wirelessly with various other devices (e.g., an electronic accessory or remote server) and networks. RF interface 508 can include RF transceiver components such as an antenna and supporting circuitry to enable data communication over a wireless medium, e.g., using cellular voice and/or data networks, Wi-Fi (IEEE 802.11 family standards), Bluetooth® (a family of standards promulgated by Bluetooth SIG, Inc.), or other protocols for wireless data communication. In some embodiments, RF interface 508 can implement a Bluetooth LE (Low energy) proximity sensor 509 that supports proximity detection through an estimation of signal strength and/or other protocols for determining proximity to another electronic device. In some embodiments, RF interface 508 can provide near-field communication ("NFC") capability, e.g., implementing the ISO/IEC 18092 standards or the like; NFC can support wireless data exchange between devices over a very short range (e.g., 20 centimeters or less). RF interface 508 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 508.

Connector interface 510 can allow master electronic device 500 to communicate with various devices (e.g., a server or electronic accessory) via a wired communication path, e.g., using Universal Serial Bus (USB), universal asynchronous receiver/transmitter (UART), or other protocols for wired data communication. In some embodiments, connector interface 510 can provide a power port, allowing master electronic device 500 to receive power, e.g., to charge an internal battery. For example, connector interface 510 can include a connector such as a mini USB connector or a custom connector, as well as supporting circuitry. In some embodiments, a device can be powered or charged via inductive charging. In some embodiments, the connector can be a custom connector that provides dedicated power and ground contacts, as well as digital data contacts that can be used to implement different communication technologies in parallel; for instance, two pins can be assigned as USB data pins (D+ and D) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which can be transmitted to or from another device in analog and/or digital formats.

Environmental sensors 514 can include various electronic, mechanical, electromechanical, optical, or other devices that provide information related to external conditions around master electronic device 500. Sensors 514 in some embodiments can provide digital signals to processing subsystem 502, e.g., on a streaming basis or in response to polling by processing subsystem 502 as desired. Any type and combination of environmental sensors can be used; shown by way of example is an accelerometer 542 and GPS receiver 548.

Accelerometer 542 can sense acceleration (relative to freefall) along one or more axes, e.g., using piezoelectric or other components in conjunction with associated electronics to produce a signal. Global Positioning System (GPS) receiver 548 can determine location based on signals received from GPS satellites. In some instances, data detected from one or more environmental sensors can be used to identify a gesture indicative of particular input. For example, rather than using a touchscreen to select a notification action and/or dismiss an alert or notification, this information can be conveyed by a particular arm movement.

Other sensors can also be included in addition to or instead of these examples. For example, a sound sensor can incorporate microphone 526 together with associated circuitry and/or program code to determine, e.g., a decibel level of ambient sound. Temperature sensors, proximity sensors, ambient light sensors, magnetometers, gyroscopic sensors or the like can also be included.

Power subsystem 512 can provide power and power management capabilities for master electronic device 500. For example, power subsystem 512 can include a battery 540 (e.g., a rechargeable battery) and associated circuitry to distribute power from battery 540 to other components of master electronic device 500 that require electrical power. In some embodiments, power subsystem 512 can also include circuitry operable to charge battery 540, e.g., when an electrical connector (not shown) is connected to a power source. In some embodiments, power subsystem 512 can include a "wireless" charger, such as an inductive charger, to charge battery 540 without relying on a physical connector. In some embodiments, power subsystem 512 can also include other power sources, such as a solar cell, in addition to or instead of battery 540.

In some embodiments, power subsystem 512 can control power distribution to components within master electronic device 500 to manage power consumption efficiently. For example, when master electronic device 500 is in an inactive state (not interacting with a user), power subsystem 512 can place device 500 into a low-power state, e.g., by powering off various components of user interface 506, RF interface 508, and/or environmental sensors 514. Power subsystem 512 can also provide other power management capabilities, such as regulating power consumption of other components of master electronic device 500 based on the source and amount of available power, monitoring stored power in battery 540, generating user alerts if the stored power drops below a minimum level, and so on.

In some embodiments, control functions of power subsystem 512 can be implemented using programmable or controllable circuits operating in response to control signals generated by processing subsystem 502 in response to program code executing thereon, or as a separate microprocessor or microcontroller.

It will be appreciated that master electronic device 500 is illustrative and that variations and modifications are possible. In various embodiments, other controls or components can be provided in addition to or instead of those described above. Any device capable of interacting with another device (e.g., an electronic accessory) to receive and/or determine connection attributes; receive, determine and/or present location information; and/or coordinate alerts based on connection attributes can be a master electronic device.

Further, while master electronic device 500 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 5 be implemented in a given embodiment of a master electronic device.

In some instances, a master electronic device sends an operation signal to one or more electronic accessories to influence an operation (e.g., initiate or control a task performance) at one or more electronic accessories. The operation signal can be transmitted to a target device directly or indirectly via one or more other devices (e.g., one or more other devices associated with a same user account as the master electronic device and/or target device).

Figure 6:
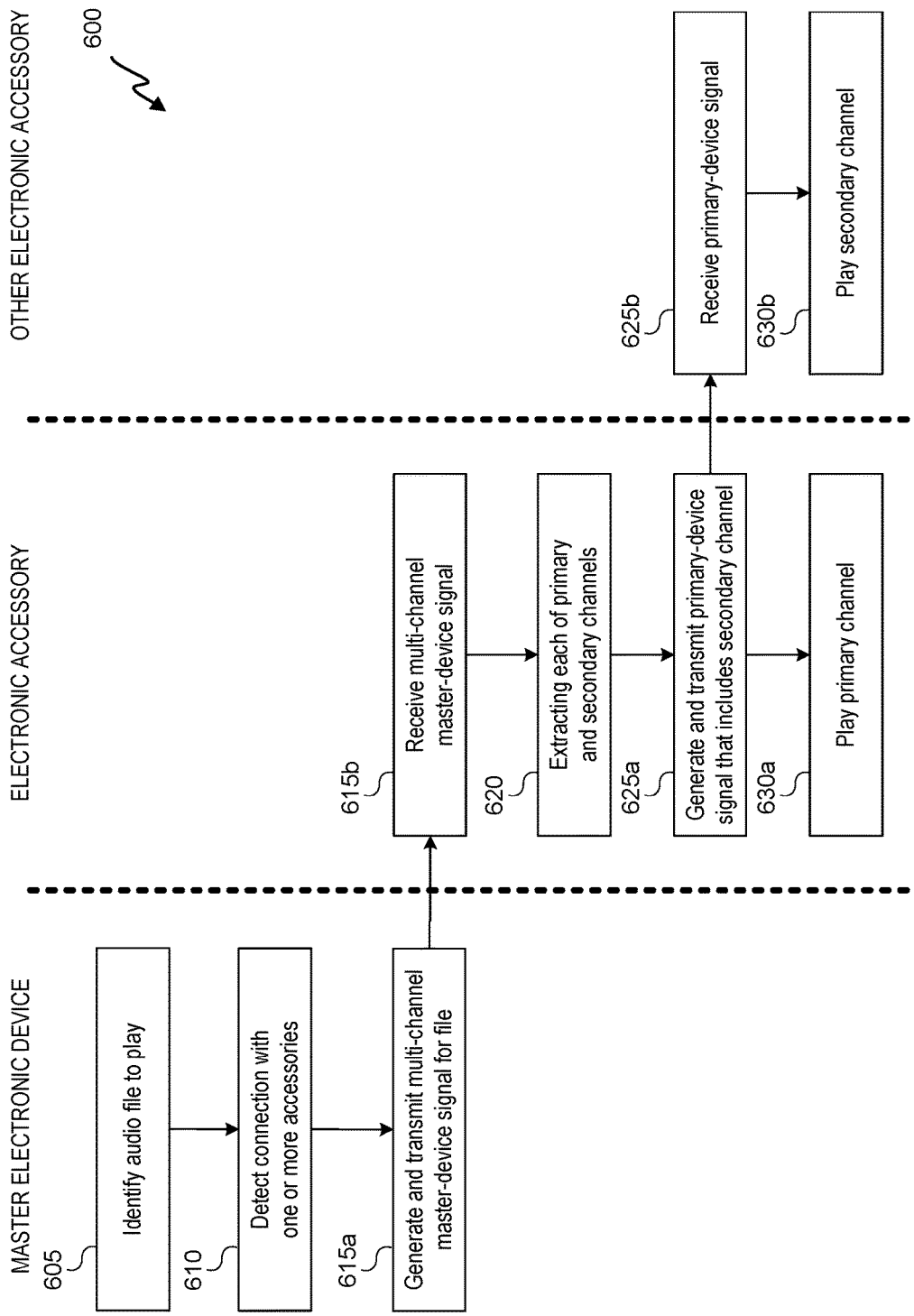
FIG. 6 is a flow diagram of a process for coordinating audio play via multiple electronic accessories of a master electronic device in accordance with an embodiment of the invention.

In one exemplary instance, one or more electronic accessories interact with a master electronic device, such that audio that is controlled at (e.g., received at or retrieved from a local storage at) the master electronic device is output at the one or more accessories. FIG. 6 is a flow diagram of a process for coordinating audio play via an electronic accessory and an other electronic accessory of a master electronic device in accordance with an embodiment of the invention. In this illustration, at least part of an operation signal transmitted by the master electronic device is transmitted to the other electronic accessory via the electronic accessory. Thus, the electronic accessory can be characterized as a primary electronic accessory, and the other electronic accessory can be characterized as a secondary electronic accessory.

At block 605, the master electronic device can identify an audio file to play. The audio file can be one stored at the master electronic device or one stored remotely (e.g., at a music server or other user device). The audio file can be selected, for example, based on a user input identifying a particular file, a user input identifying a channel, data pertaining to audio preferences of the user, and/or a selection process. For example, an audio file can be pseudo-randomly selected from amongst those locally stored at the master electronic device. Upon identifying the audio file, the master electronic device can retrieve the file from a local storage or request the file from a remote source.

At block 610, the master electronic device can detect a connection with an electronic accessory. The detecting can include, for example, identifying and/or detecting one or more electronic accessories (e.g., of a particular device type, being configured to serve as a "primary" accessory, having a particular capability, having a particular device identifier and/or being associated with a same user account as is associated with the master electronic device) over a type of network (e.g., a short-range network or BTLE network). For example, block 610 can include detecting all earphone devices paired to the master electronic accessory.

In some instances, master electronic device can detect multiple electronic accessories and can then identify an incomplete subset (e.g., one accessory) to transmit a signal to. The subset identification can be based on, for example, priorities, types, geographical proximity, connection strength, and so on of the detected accessories. In one instance, block 610 includes detecting a single electronic accessory (e.g., primary electronic accessory and not a secondary electronic accessory). Such single-accessory detection may, or may not, limit an influence of a transmitted signal to the single accessory. For example, in one instance, only the detected electronic accessory is influenced by a transmitted signal. As another example, the detected electronic accessory can itself detect an other electronic accessory to which it can route part or all of the signal (or processed version thereof). In some instances, the master electronic device detects multiple electronic accessories and coordinates transmission of part or all of a signal (or processed version thereof) to each of the multiple electronic accessories.

At block 615*a*, the master electronic device can generate a multi-channel master-device signal for the audio file and can transmit the signal to a detected electronic accessory. The master-device signal can thus include multiple channels, each of which corresponds to the audio file. In some instances, the channels correspond to stereo channels (e.g., a "right" channel and a "left" channel). In some instances, the channels have the same audio data.

The multi-channel master-device signal can, in some instances, include an indication as to which accessory is to use which signal. For example, a signal may be identified as a "primary" channel or "right" channel to be handled by an electronic accessory having a corresponding designation or configuration. As another example, a signal can associate each of one or more channels with an identifier of an accessory.

In some instances, the multi-channel master-device signal can include additional data, such as a time to begin play of a channel and/or a volume setting. The multi-channel master-device signal can be transmitted, for example, wirelessly over a short-range network.

At block 615b, the electronic accessory can receive the multi-channel master-device signal, and at block 620, the electronic accessory can extract each of a primary and secondary channel from the master-device signal. The extraction can include identifying a channel in the signal to be played at the electronic accessory (the primary channel) and/or identifying a channel in the signal to be transmitted to an other electronic accessory. This identification can be performed, for example, based on a characterization of each of one or more channels in the signal or using another technique (e.g., selecting a first channel as a primary channel).

At block 625a, the electronic accessory can generate a primary-device signal that includes the secondary channel and can transmit the primary-device signal (e.g., wirelessly and/or over a short-range network) to the other electronic accessory. In various instances, the primary-device signal may, or may not, include the primary channel.

The electronic accessory can identify the other electronic based on a local detection and/or based on data in the signal. For example, the multi-channel master-device signal can include an identifier of the other electronic accessory, or the electronic accessory can itself detect the other electronic accessory (e.g., in a manner similar to one described in reference to block 610). At block 625b, the other electronic accessory can receive the primary-device signal.

At block 630a, the electronic accessory can play the primary channel, and at block 630b, the other electronic accessory can play the secondary channel. In some instances, the accessories can play the respective channels as soon as they are available. The transmission of the primary-device signal can introduce a small delay, though it can be short enough that it is not noticeable to a listener.

Thus, process 600 exemplifies how one electronic accessory can serve as a primary electronic accessory and route part or all of a signal from a master electronic device to an other electronic accessory. While process 600 involves play of an audio file, it will be appreciated that other embodiments may be extended to streaming or transmission of other types of audio data (e.g., a speech signal received at the master electronic device as part of a call).

Figure 7:
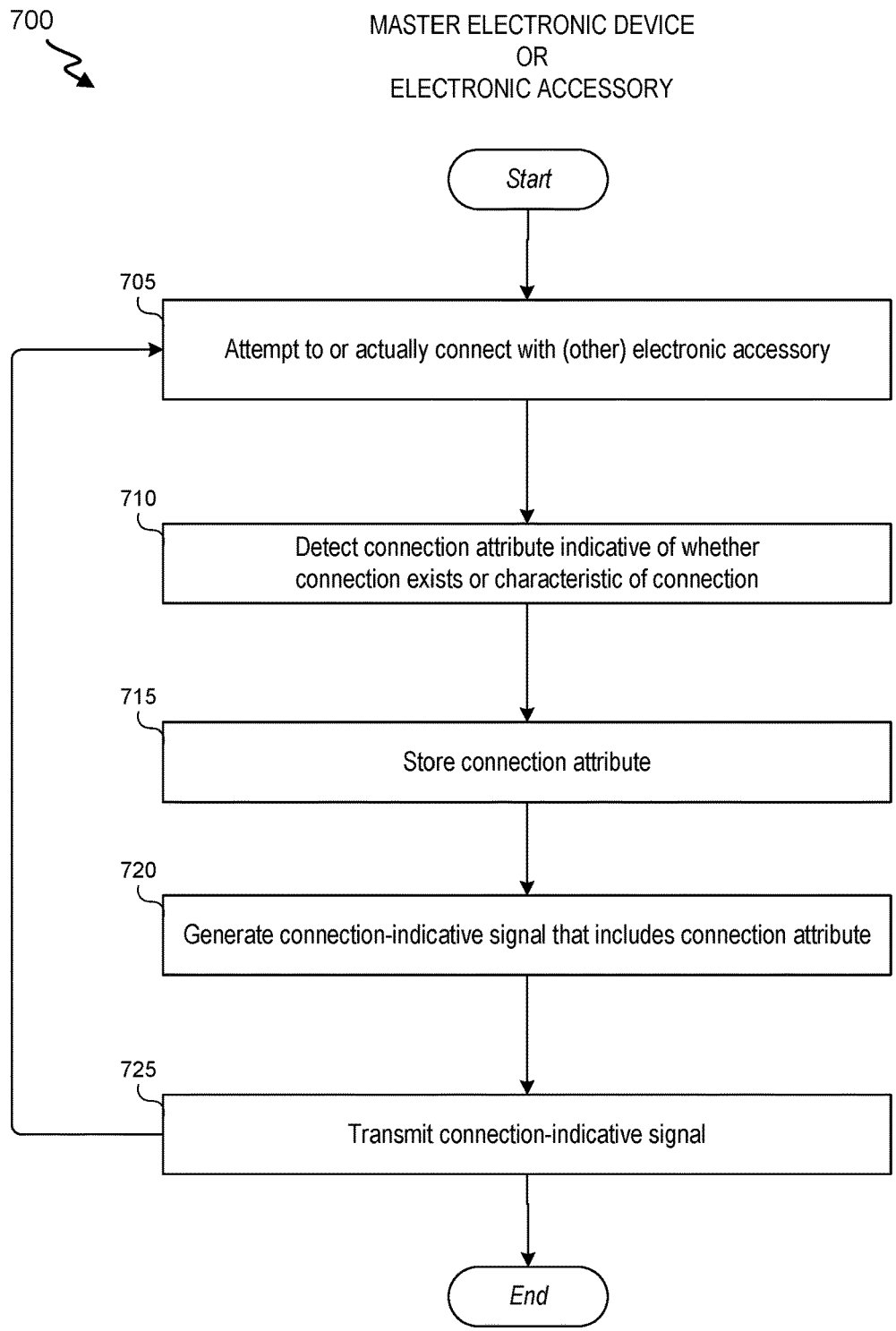
FIG. 7 is a flow diagram of a process for detecting, storing and/or transmitting a connection attribute pertaining to an electronic accessory of a master electronic device in accordance with an embodiment of the invention.

FIG. 7 is a flow diagram of a process 700 for detecting, storing and/or transmitting a connection attribute pertaining to an electronic accessory of a master electronic device in accordance with an embodiment of the invention. Part or all of process 700 can be performed by a master electronic device or electronic accessory (e.g., a primary electronic accessory).

At block 705, a device (e.g., a master electronic device or electronic accessory) can attempt to or can actually connect with an electronic accessory. For example, a master electronic device can connect with (or attempt to communicate with) a primary electronic accessory, and/or a primary electronic accessory can connect with (or attempt to communicate with) a secondary electronic accessory. The connection can be of a particular type, such as a wireless connection over a short-range network.

The attempted or actual connection can include transmitting one or more signals (e.g., in a directed or broadcast fashion) and/or monitoring for incoming signals (e.g., responsive to an outgoing signal). Block 705 can include attempting to establish or establishing a new connection or maintaining an existing connection.

The electronic accessory can be one having one or more particular characteristics (e.g., being associated with a particular user account, being of a particular device type and/or having a particular device identifier). For example, block 705 can include attempting to connect with any paired earphone device via a short-range network (e.g., BTLE network).

For attempted communications, block 705 can include determining whether any accessory can be detected (e.g., generally or over a particular type of network). In one instance, block 705 includes enabling or detecting a pairing between the device performing block 705 and an electronic accessory.

At block 710, a connection attribute indicative of whether a connection exists or a characteristic of a connection can be detected. Thus, in some instances, a connection attribute is indicative of whether a device is (e.g., wirelessly) connected to an accessory. For example, block 710 can include determining whether a device (e.g., a master electronic device or electronic accessory) can communicate with an (other) electronic accessory (e.g., generally or over a particular type of connection, such as a short-range connection). As another example, block 710 can include determining whether a device (e.g., a master electronic device or electronic accessory) is paired to an (e.g., other) electronic accessory. In some instances, a connection attribute is indicative of a characteristic of an existing connection. For example, a connection attribute can include a strength of a connection, a latency of a communication, a link parameter, and/or a type of network that the connection is on. In some instances, a connection attribute reflects a change. For example, a connection attribute can be indicative of a new connection, a disconnection or a decreased or increased connection strength, and so on.

When the attempted or actual connection evaluated includes a short-range connection, the connection attribute can be indicative of a separation distance between the device performing block 710 and the electronic accessory. For example, a connection attribute indicating that there is no connection with the electronic accessory or that a connection is weak can indicate that there is a relatively high separation distance.

At block 715, the connection attribute can be stored. The connection attribute can be stored locally or a remote storing of the connection attribute can be facilitated. The connection attribute can be stored along with other data, such as a time associated with the detection, an identifier of a device performing block 710, and/or an identifier or characteristic of the electronic accessory that the device was or was attempting to connect to. The connection attribute can also or alternatively be stored with an estimated location. The estimated location can be one of a device having detected the connection attribute, a device storing the connection attribute and/or the electronic accessory.

In some instances, the connection attribute is stored in a data structure that includes one or more other connection attributes (e.g., associated with a different time and/or device location). For example, the data structure can include a table or array. The data structure can, in some instances, also include one or more connection attributes associated with a different device. For example, one or more data structures can include a connection attribute associated with an actual or attempted connection between a master electronic device and a primary electronic accessory and also a connection attribute associated with an actual or attempted connection between a primary electronic accessory and a secondary electronic accessory.

At block 720, a connection-indicative signal that includes the connection attribute can be generated. In some instances, the connection-indicative signal can include other data, such as a time, estimated device location, an identifier of a device performing block 710, and/or an identifier or characteristic of the electronic accessory.

At block 725, the connection-indicative signal can be transmitted. The signal can be transmitted to, for example, another user device and/or remote server. In one instance, an electronic accessory performing part or all of process 700 transmits the signal to a master electronic device (e.g., a paired master electronic device).

Process 700 can then return to block 705, such that connection attributes can be repeatedly monitored.

It will be appreciated that, in various embodiments, process 700 can include fewer and/or additional blocks. For example, in some instances, block 715 can be omitted from process 700 (e.g., when an electronic accessory is performing process 700). As another example, blocks 720-725 can be omitted from process 700 (e.g., when a master electronic device is performing process 700).

Figure 8:
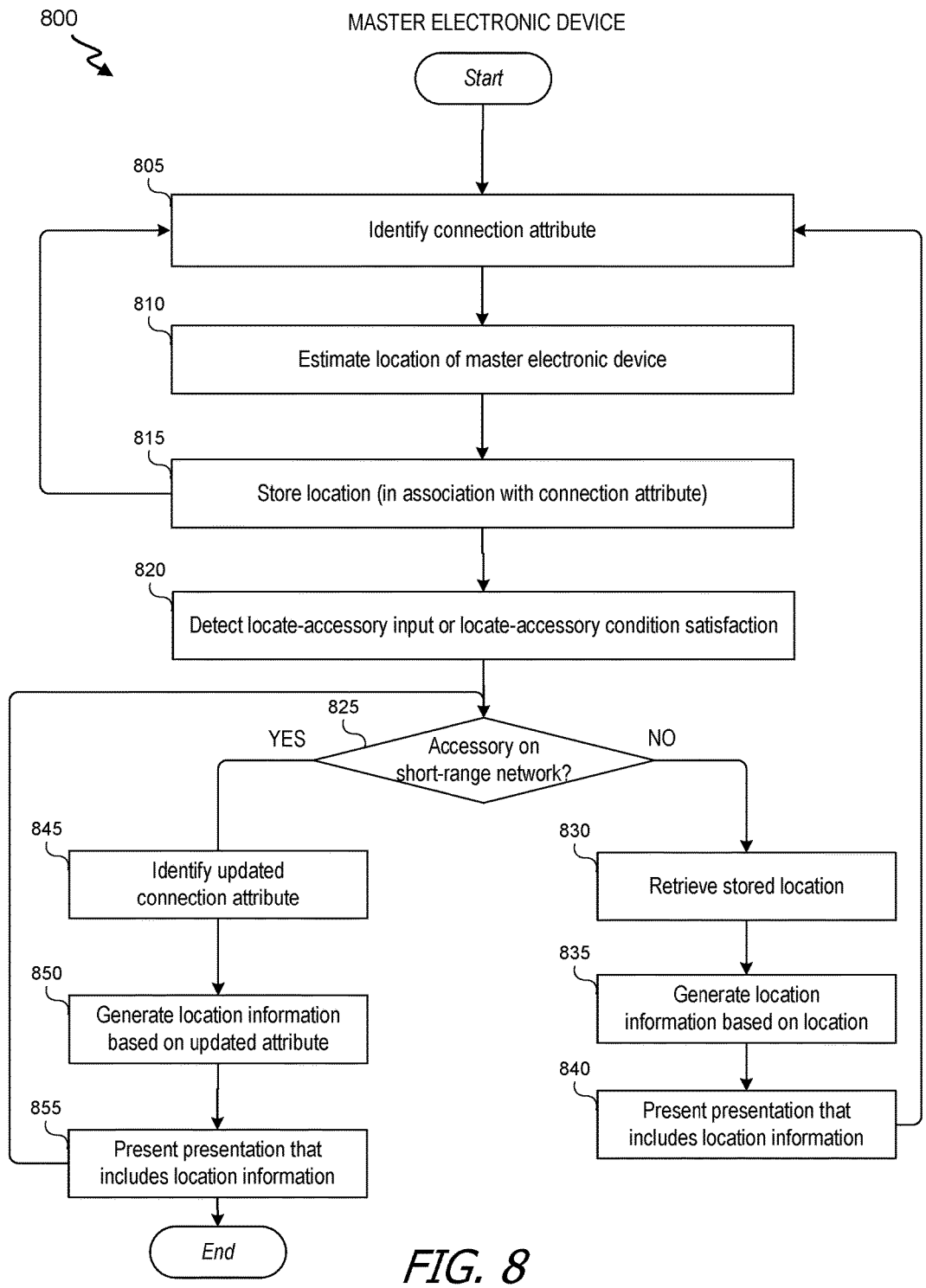
FIG. 8 is a flow diagram of a process for generating and presenting location information pertaining to an electronic accessory of a master electronic device in accordance with an embodiment of the invention.

FIG. 8 is a flow diagram of a process 800 for generating and presenting location information pertaining to an electronic accessory of a master electronic device in accordance with an embodiment of the invention. Part or all of process 800 can be performed by a master electronic device.

At block 805, a connection attribute can be identified. The connection attribute can, for example, pertain to a presence or characteristic of a connection between the master electronic device and an electronic accessory or a presence or characteristic of a connection between an electronic accessory and an other electronic accessory. The connection attribute can be locally detected or included in a connection-indicative signal that can be received from an electronic accessory (e.g., a primary electronic accessory). The connection attribute can include one locally or remotely detected at block 710 in process 700.

At block 810, a location of the master electronic device can be estimated. The location can be estimated, e.g., based on a triangulation technique and/or signals from one or more GPS satellites or other signal sources.

At block 815, the location can be stored. In some instances, the location can be stored in association with the connection attribute. For example, the connection attribute and location can be included in a same row or same column in a table. In some instances, multiple connection attributes are stored (e.g., in an element of a data structure, such as in a same row). For example, block 815 can include storing a connection attribute locally detected by the master electronic device that is indicative of a presence or characteristic of a connection between the master electronic device and a primary electronic accessory and also a connection attribute included in a received connection-indicative signal that is indicative of a presence or characteristic of a connection between the primary electronic accessory and a secondary electronic accessory. The connection attribute can be stored along with other data, such as a time, an identifier of one or more devices (e.g., a primary and/or secondary electronic device), and/or a characteristic of one or more devices (e.g., a primary and/or secondary electronic device).

In some instances, the location is not explicitly stored in association with a connection attribute, though storage of the location can be indicative of a connection attribute. For example, storing the location can be conditioned upon detection of a particular connection attribute (e.g., indicative of a recent disconnection or a connection strength above a threshold).

At block 820, a locate-accessory input or connection state signal (or satisfaction of a locate-accessory condition) can be detected. For example, the master electronic device can locally detect an input received via an app that identifies an accessory (e.g., a primary or secondary electronic accessory) and/or requests location information, or the master electronic device can receive a signal (e.g., over a WiFi connection) from another user device that requests location information.

As another example, the master electronic device can detect that a locate-accessory condition is satisfied based on the connection attribute or another (e.g., more recent) connection attribute (e.g., identified in a manner similar to that described with reference to block 805). The locate-accessory condition can be defined such that, for example, it is satisfied when a connection attribute or change thereof exceeds a threshold or when a connection attribute is indicative of a recent disconnection. The locate-accessory condition can be the same as, or different than, an alert condition. For example, a connection-strength threshold in an alert condition can be higher than a connection-strength threshold in a locate-accessory condition.

Evaluation of the locate-accessory condition can be performed at the master electronic device or remotely. For example, in some instances, block 820 can include receiving a signal from a primary electronic accessory that indicates that the locate-accessory condition has been satisfied based on an analysis of a connection attribute indicative of a presence or characteristic of a connection between the primary electronic accessory and a secondary electronic accessory.

At block 825, it can be determined whether an accessory associated with the detection is available (e.g., directly or indirectly) via one or more short-range networks (e.g., one or more BTLE networks). For example, a locate-accessory input can indicate that a user is requesting assistance in locating a particular primary electronic accessory, and block 825 can include determining whether the master electronic device can detect the primary electronic accessory over a short-range network. As another example, block 825 can include determining whether the master electronic device can communicate with a secondary electronic accessory via a chain of short-range networks (e.g., through a primary electronic accessory).

When it is determined that the master electronic device cannot communicate with the accessory via one or more short-range networks (e.g., exclusively), process 800 can continue to block 830 where a stored location can be retrieved. In instances where multiple locations had been stored in association with the accessory, block 830 can include selecting from amongst the locations. The selection can include, for example, selecting a most recently stored location, selecting a location associated with an above-threshold or particular connection attribute, and/or selecting a location associated with a maximum or local maximum of a connection attribute.

To illustrate, a data structure can include a time-series of connection strengths. Over a previous 30-minute period, the structure can identify a rise and fall in a connection strength. The retrieved stored location can be one associated with a peak in the rise and fall. As another illustration, the selection can include identifying a most recent element in the data structure associated with a connection attribute above a defined threshold.

At block 835, location information can be generated based on the location. Location information can include the location or a processed version thereof (e.g., converting coordinates to an address and/or identifying the location on a map) and/or can include partial or full directions to the location. The directions can include, for example, written, pictorial, verbal or non-verbal directions. For example, directions can include an audio signal indicative of whether a user is moving in a direction towards or away from the location.

At block 840, a presentation can be presented that includes the location information. The presentation can include, for example, written words, an image, audio words or other stimuli, and/or haptic stimuli. For example, the presentation can include a map with an identifier of the location.

In some instances, the presentation can be repeatedly updated based on one or more newly identified connection attributes and/or device locations. Thus, process 800 can, in some instances, return to again perform one or more of blocks 805-815. In some instances, this repetition can result in an updated decision at block 825 that the accessory has become detected over one or more short-range networks.

Upon an initial or subsequent decision that the accessory is detected via one or more short-range networks (e.g., generally or of a particular type, such as BTLE), process 800 can continue to block 845 at which an updated connection attribute can be identified. Block 845 can parallel block 805 but can include a substantially real-time connection attribute pertaining to the accessory.

At block 850, location information can be generated based on the updated connection attribute. The location information can include an estimated location of the accessory and/or partial or full directions to an estimated location of the accessory. Thus, in some instances, the location information generated at block 850 can be of a same type as location information generated at block 835.

In some instances, each of blocks 835 and 850 include generating location information based on an estimated location, though the blocks can differ with respect to which device the estimated location pertained to. The location used at block 835 can include one of a master electronic device. When the location was associated with a connection attribute or stored in a manner indicating that the master electronic device was connected to the accessory via one or more short-range networks, the master device location can serve as a good proxy for a location of the accessory.

Meanwhile, at block 850, an estimated location of the accessory itself can be identified (e.g., absolutely or relatively to another device) and used to generate the location information. The location of the accessory can be determined, for example, based on one or more connection attributes (e.g., time-lapsed connection attributes) and/or one or more associated estimated locations of a master electronic device. For example, master electronic device can detect that a connection strength with the accessory is increasing (e.g., according to a particular factor) as the master electronic device is moved along a direction and can use the detected increase (and/or factor) to estimate the location.

In some instances, the location information generated at block 850 does not include an explicit identification of a location or directions but instead presents the updated connection attribute (or processed version thereof) in a manner that can be used to locate the accessory. For example, a real-time dynamic identification of a connection-strength value can aid a user in determining whether she is moving towards the accessory.

At block 855, a presentation that includes the location information can be presented. The presentation can include, for example, written words, an image, audio words or other stimuli, and/or haptic stimuli. For example, the presentation can include a map with an identifier of the location. In some instances, process 800 can return to block 825 such that location information can be repeatedly updated based on new connection attributes. Process 800 can terminate, e.g., upon detecting that the master electronic device has arrived at an estimated location of the accessory or detecting an input terminating a locate-accessory effort.

It will be appreciated that many variations of process 800 are contemplated. For example, in one instance, a process can include blocks 805-820 and 830-840 but not one or more of blocks 845-855. As another example, a process can include blocks 820 and 845-855 but not one or more of the remaining blocks. As yet another example, block 825 can be modified to determine whether the accessory can be detected on a non-short-range network (e.g., any network or a WiFi network).

It will also be appreciated that additional actions can be included in process 800. For example, after block 845, a location of the accessory can be estimated based on the updated connection attribute, and the location information generated at block 850 can be based on the estimated accessory location. As another example, the updated connection attribute can be stored.

It will further be appreciated that, while FIG. 8 depicts a process being performed by a master electronic device, in some embodiments, part or all of the process can be defined by an electronic accessory. For example, a primary electronic accessory can identify a connection attribute relating to a presence or characteristic of a connection between the primary electronic accessory and a secondary electronic characteristic. In various embodiments, the primary electronic accessory may, or may not, estimate the location of the primary electronic accessory (or a secondary electronic accessory). The primary electronic accessory can store the connection attribute (e.g., in association with a corresponding accessory location and/or time) and can further participate in an accessory-locating effort using the stored data. Such presentation can include, for example, transmitting stored data (e.g., to a master electronic device) and/or facilitating a presentation of stored data (e.g., at the primary electronic accessory or at the master electronic device).

FIG. 9 is an example of a representation of a data structure storing connection attributes pertaining to an electronic accessory of a master electronic device in accordance with an embodiment of the invention. The data structure can be locally stored at the master electronic device (and/or one or more accessories) and/or at a remote source. The data structure can be managed (e.g., available for updating) by the master electronic device and/or one or more other devices (e.g., an accessory and/or remote source).

In the depicted example, each row includes a time (date and time of day), an estimated location of a master electronic device and a connection attribute associated with each of a connection between the master device and a first accessory and the first accessory and the second accessory. The connection attribute associated with the connection between the master device and first accessory can include one detected at the master device, and the connection attribute associated with the connection between the two accessories can include one detected at the first accessory and transmitted to the master device. In the depicted example, the connection attribute is a strength of a connection (e.g., a strength of a BTLE connection), and the estimated location is expressed in terms of geographical coordinates.

Across the first four times in the depicted example, the connection between the master device and first accessory is consistently strong, whereas the connection between the first and second accessories is weakening. Thus, if a locating effort of the second accessory were initiated after the fourth time, one approach would be to retrieve a most recent master device location associated with a strong second connection attribute, which in this case, could be the first estimated location.

Meanwhile, across the last four times in the depicted example, the connection between the accessories is consistently strong (for available entries), whereas the connection between the master device and first accessory is weakening. Thus, if a locating effort of an accessory (e.g., the first or the second accessory) were initiated after the eighth time, one approach would be to retrieve a most recent master device location associated with a strong first connection attribute (or with two strong connection attributes), which in this case, could be the fifth estimated location.

Figure 10A:
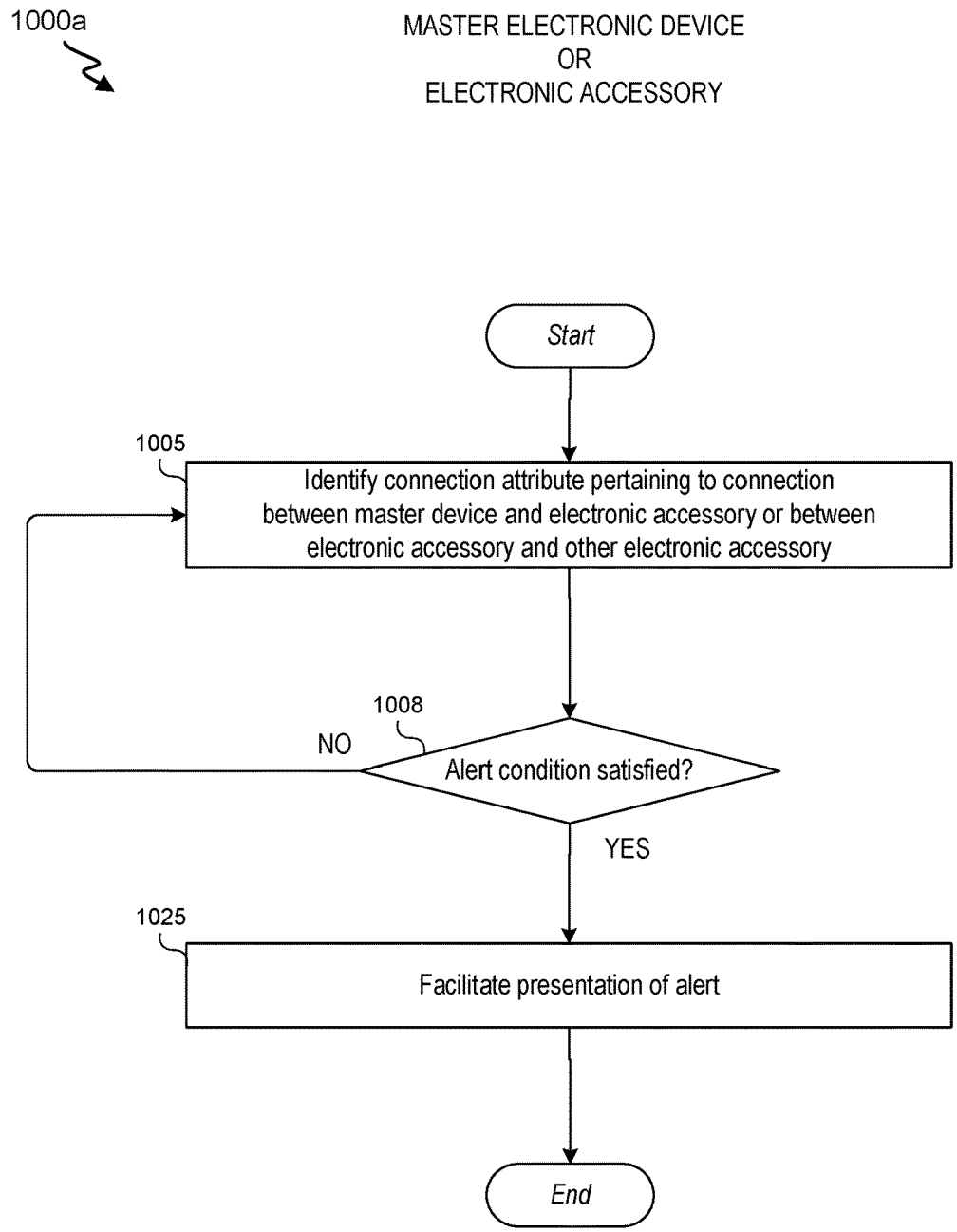
FIGS. 10A and 10B are flow diagrams of processes for facilitating presentation of an alert pertaining to an electronic accessory of a master electronic device in accordance with an embodiment of the invention.
Figure 10B:
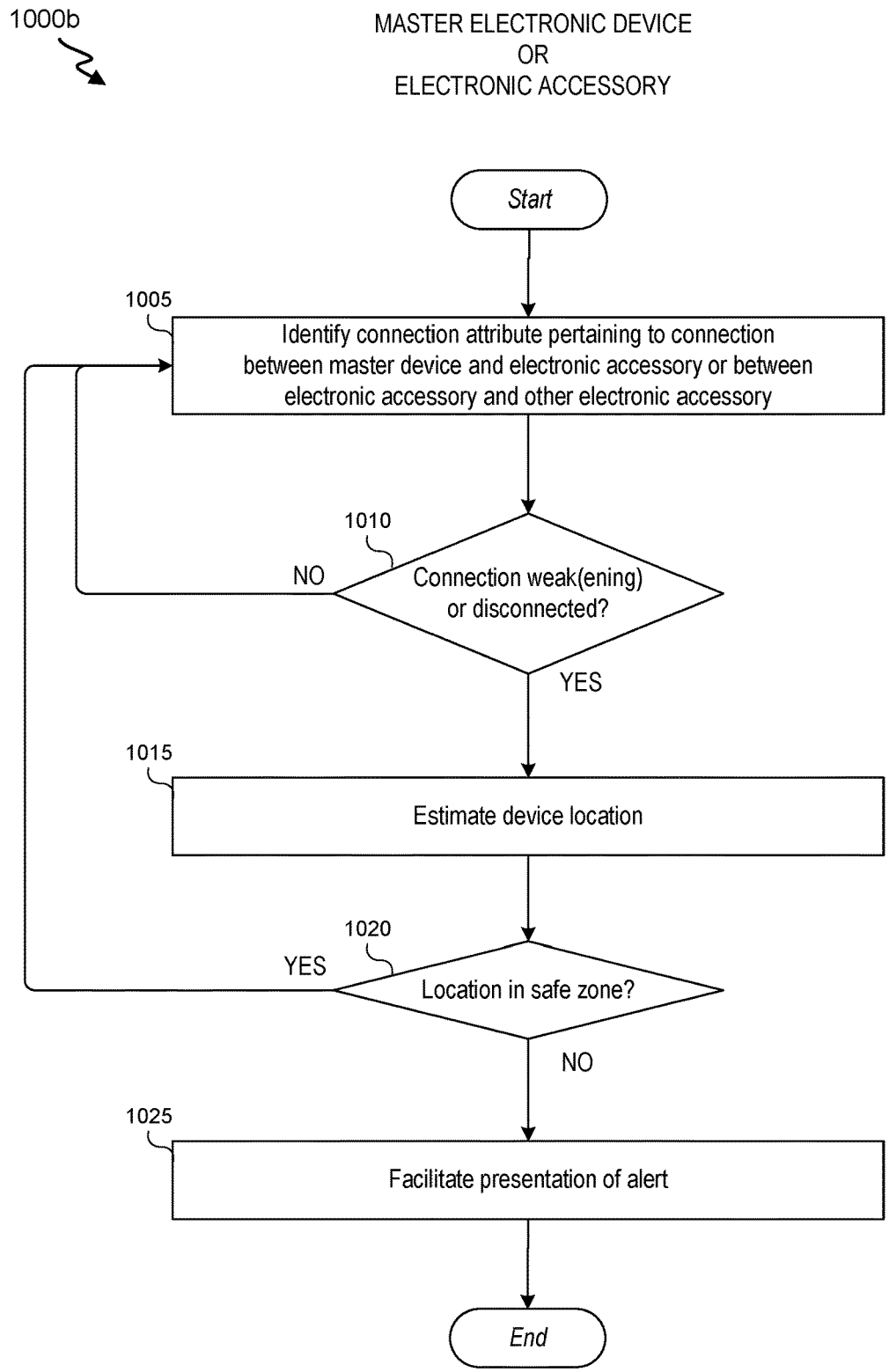

FIGS. 10A and 10B are flow diagrams of processes 1000a and 1000b for facilitating presentation of an alert pertaining to an electronic accessory of a master electronic device in accordance with an embodiment of the invention. Part or all of process 1000a and/or 1000b can be performed by a master electronic device or an electronic accessory (e.g., a primary electronic accessory).

Beginning with process 1000a, at block 1005, a connection attribute can be identified. The connection attribute can, for example, pertain to a presence or characteristic of a connection between the master electronic device and an electronic accessory or a presence or characteristic of a connection between an electronic accessory and an other electronic accessory. The connection attribute can be locally detected or included in a connection-indicative signal that can be received from an electronic accessory (e.g., a primary electronic accessory). The connection attribute can include one locally or remotely detected at block 710 in process 700.

At block 1008, it can be determined whether an alert condition is satisfied based on the connection attribute. In some instances, the determination can include processing one or more connection attributes (e.g., to generate an average or difference) and analyzing the processed connection attribute(s).

The alert condition can include, for example, an identification of a particular attribute (e.g., indicative of a new disconnection), such that the alert condition is satisfied when the attribute is detected. The alert condition can include a threshold, such that the alert condition is satisfied when the attribute or a change in the attribute exceeds the threshold. The alert condition can be defined such that it is satisfied in circumstances which can correspond to a high or increasing separation between devices.

The alert condition can be fixed or at least partly defined, for example, based on user input and/or a learning technique. For example, a threshold can be defined based on a distribution of connection attributes.

In some instances, block 1008 can include determining one or more variables pertaining to a satisfaction of an alert condition. For example, an electronic accessory can be identified (e.g., based on which connection attribute has exceeded a threshold). As another example, a degree to which a connection attribute is exceeding a threshold can be determined.

When it is determined that the alert condition is not satisfied, process 1000a can return to block 1005. When it is determined that the alert condition is satisfied, presentation of an alert can be facilitated at block 1025. The facilitation can include locally presenting an alert and/or transmitting an alert-instruction signal to one or more devices (e.g., a device performing process 1000a, a device presumably having a high or increasing separation from a device performing process 1000a, a master electronic device, an electronic accessory, a primary electronic accessory and/or a secondary electronic accessory.

The alert can include, for example, an audio, visual or haptic alert. For example, an alerting device can vibrate, flash a light stimulus, present a notification and/or emit an audio stimulus. The alert can be indicative that the alert condition is satisfied and/or can identify an electronic accessory. In some instances, an alert can be presented along with location information.

Process 1000a and 1000b can include some similar or same actions. For example, blocks 1005 and 1025 in process 1000b can parallel respective blocks in process 1000a. Process 1000b illustrates one example of an analysis of an alert condition.

At block 1010, the connection attribute can be analyzed to determine whether a connection is weak, weakening and/or disconnected. The analysis can include comparing the connection attribute (or a processed version thereof, such as a difference between the connection attribute and a previous connection attribute) to a threshold. For example, in one instance, block 1010 includes detecting whether a previous short-range connection with an electronic accessory has become disconnected. As another example, in one instances, block 1010 includes detecting that a change in a latency associated with a connection with an electronic accessory has dropped below a threshold value.

When block 1010 results in a negative result, process 1000b can return to block 1005 such that a connection attribute can be repeatedly monitored. When block 1010 results in an affirmative result, process 1000b can proceed to block 1015 where a location of a device can be estimated. The device can include, for example, one performing part or all of process 1000b, a master electronic device, an electronic accessory, and/or a device associated with a weak or weakening connection or disconnection. It will be appreciated that, in some instances, the device location includes a past location of a master device though such location may correspond to a proxy of a current location of an electronic accessory.

In some instances, the location can be estimated, e.g., based on a triangulation technique and/or signals from one or more GPS satellites or other signal sources. In some instances, the location can be estimated based on one or more connection attributes and/or by using a stored device location and/or data structure. For example, in an instance where a connection attribute associated with an accessory has decreased since a master electronic device has moved away from a given location, an estimated location of the accessory can be identified as the given location.

At block 1020, it can be determined whether the location is within any of one or more safe zones. A safe zone can be defined in part or in its entirety by a user and/or based on historical data. For example, a safe zone can correspond to a user-identified home address or a geographical region in which one or more users devices are located within for a defined period of time (e.g., at least 5% of each of 4 of 5 previous weeks). A safe zone can be identified based on meanings, such that there can be (for example) a home and a work safe zone.

A safe zone can have a boundary defined based on location history of a device (e.g., to estimate an edge of a property or building) or a boundary that is defined according to a standard shape, such as a circle. For example, a "home" safe zone can be defined to have a 200-foot radius; the radius can be fixed, determined based on device location history or set by a user.

A safe zone can be defined in terms of absolute or relative location. For example, a safe zone can be defined based on a range of latitude and longitude values. As another example, a safe zone can be defined as a region within a defined radius from a particular user device (e.g., a car accessory) or any of two or more other user devices.

In some instances, a definition of one or more safe zones can include conditions. For example, a "work" safe zone may be defined to only exist during defined working hours.

In some instances, a definition of a safe zone depends on which devices are associated with a weak or weakening connection or disconnection. For example, if two earphone accessories are being left behind in a home safe zone, the safe zone can apply to prevent an alert; meanwhile, if only one is being left behind, the safe zone can be defined not to apply such that an alert is presented.

When it is determined that the location is in a safe zone, process 1000b can return to block 1005. When it is determined that the location is not in a safe zone, process 1000b can proceed to block 1025 to facilitate presentation of an alert.

As one exemplary illustration, a smart phone and two wireless earphones can be moving about in parallel, and connection attributes can be indicative of strong short-range connections between the device. One wireless earphone can then transmit a signal to the smart phone identifying a weaker connection attribute, and the smart phone can determine that the attribute is below a threshold. The smart phone can use a stored data structure to identify a most recent smart phone location associated with an above-threshold attribute and can analyze the location to determine whether it is in any safe zone defined for the accessory. The smart phone can determine that the location is not in a safe zone and can then present a local audio alert and/or transmit a signal to the earphone presumably being left behind (e.g., via the other earphone).

Figure 11:
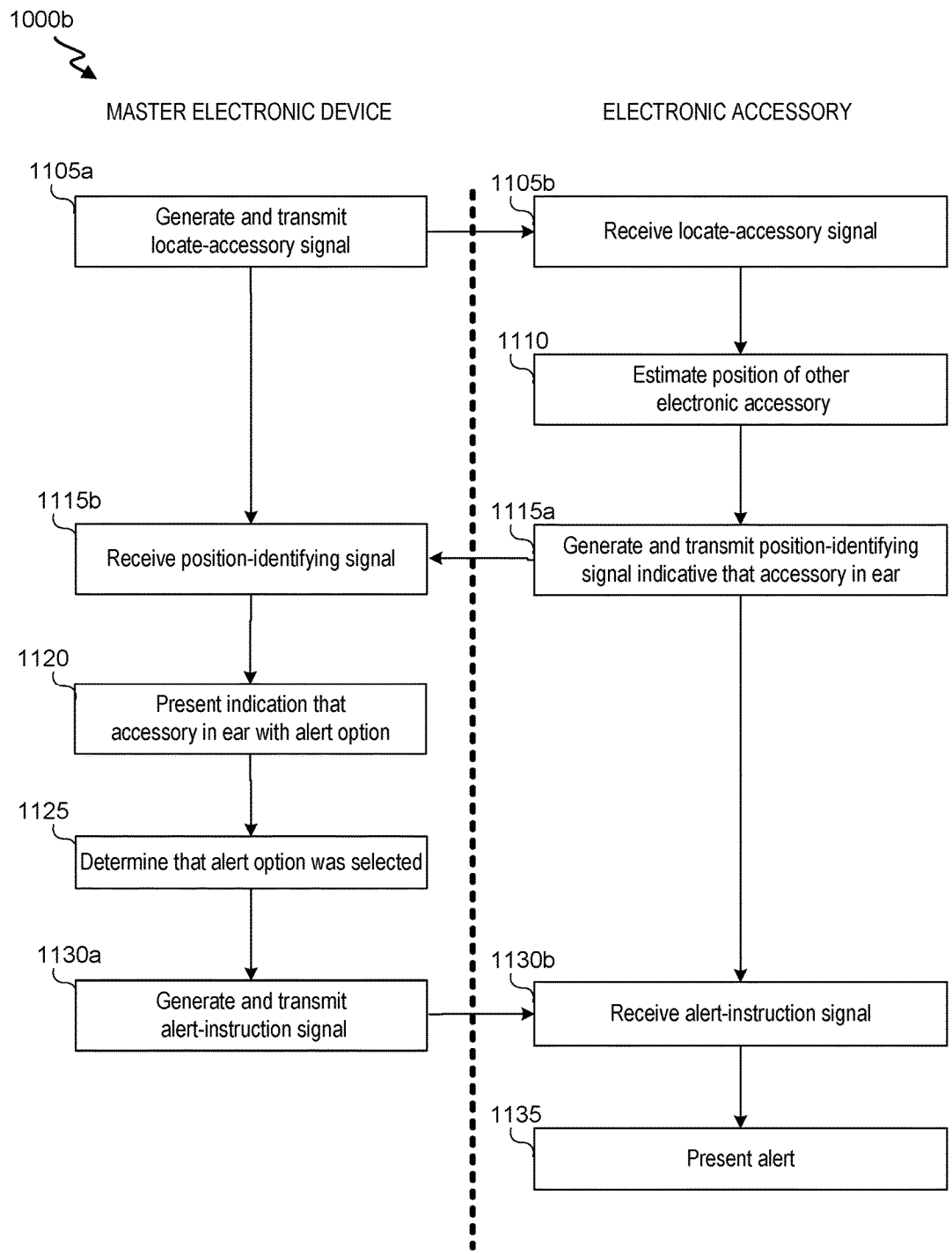
FIG. 11 is a flow diagram of a process for coordinating presentation of an alert pertaining to an electronic accessory of a master electronic device in accordance with an embodiment of the invention.

FIG. 11 is a flow diagram of a process 1100 for coordinating presentation of an alert pertaining to an electronic accessory of a master electronic device in accordance with an embodiment of the invention.

At block 1105a, a master electronic device can generate and transmit a locate-accessory signal. The locate-accessory signal can be generated, for example, in response to detecting a locate-accessory input (e.g., received locally at the master electronic device or remotely). As another example, the locate-accessory signal can be generated upon detecting that a locate-accessory condition has been satisfied based on one or more connection attributes. The locate-accessory signal can include an identifier of the electronic accessory that can be associated, for example, with a locate-accessory input or locate-accessory condition satisfaction.

At block 1105b, an electronic accessory (e.g., a primary or secondary electronic accessory) can receive the locate-accessory signal, and at block 1110, the electronic accessory can estimate its position. The position can include one or more angular and/or orientation positions and/or an estimation as to whether the accessory is being worn (e.g., generally or by a particular person). The position estimation can be accomplished using data collected from one or more environmental sensors on the accessory, such as a gyroscope, accelerometer, thermometer, heart monitor, etc. In some instances, one or more sensor readings can be compared to one or more corresponding thresholds to estimate the position (e.g., whether it is being worn).

The electronic accessory can, for example, repeatedly and/or continuously perform block 1110 or perform block 1110 in response to detecting a particular event (e.g., detecting satisfaction of an alert condition, detecting that a connection attribute has exceeded a threshold, detecting a request for the position, detecting the locate-accessory signal, and so on).

At block 1115a, the other electronic accessory can generate and transmit a position-identifying signal that includes and/or is indicative of the position. In the depicted instance, the position-identifying signal can indicate that the accessory is in a person's ear (e.g., due to one or more sensor measurements included in the signal or an indication in the signal that the accessory is estimated as being in a person's ear). In some instances, mere transmission of the signal is itself indicative of the transmission (e.g., it can be selectively transmitted when it is estimated that the other electronic accessory is being worn).

The master electronic device can receive the position-identifying signal at block 1115b and present an indication (e.g., a visual notification) that the accessory is estimated to be in a person's ear at block 1120. The indication can be presented along with an option to nonetheless initiate an audio alert on the electronic accessory. In some instances, the indication can be presented with location information.

At block 1125, it can be determined that the alert option was selected. In response, the master electronic device can generate and transmit an alert-instruction signal at block 1130a. Generation and/or transmission of the alert-instruction signal can be conditioned upon determining that the alert option was selected. The alert-instruction signal can include one or more characteristics of an alert to be presented (e.g., a tone, intensity, temporal dynamic variation, and/or whether a warning is to be presented in advance of an alert).

At block 1130b, the electronic accessory can receive the alert-instruction signal, and at block 1135, the electronic accessory can present an alert (e.g., in accordance with any characteristics of the alert as identified in the signal or otherwise defined). In some instance, the alert includes an audio stimulus, such as a sustained tone, pulsed sound or verbal communication. A verbal communication can, for example, indicate that an effort is being made to locate the accessory or identify information about a user associated with the accessory (e.g., a phone number). A verbal communication can also precede another audio stimulus and can serve as a warning for the impending audio stimulus.

The depicted embodiment of process 1100 includes direct communications between a master electronic device and an electronic accessory. It will be appreciated that indirect communications are also contemplated. For example, the electronic accessory that presents the alert can include a secondary electronic accessory, and communications between the second electronic accessory and the master electronic device can be transmitted via a primary electronic accessory. In various embodiments, the primary electronic accessory may, or may not, perform additional actions beyond simply relaying data and instructions. For example, the primary electronic accessory can receive a communication from an electronic accessory with sensor data and itself estimate whether the secondary electronic accessory is being worn.

The depicted embodiment of process 1000 pertains to an instance in which it is estimated that the electronic accessory is in a person's ear. If it is estimated that the electronic accessory is not in a person's ear, in some instances, blocks 1115*a*-1130*b* can be omitted, such that an alert is then presented without requiring an additional signal from the master electronic device. In effect, the locate-accessory signal can then serve as an alert-instruction signal. In some instances, the master electronic device can monitor for a position-identifying signal that indicates that the accessory is in an ear and can transmit an alert-instruction signal upon not detecting such a signal within a defined time period and/or upon detecting a signal indicating that the accessory is not in an ear.

Thus, embodiments of the present invention can provide a variety of techniques to track electronic accessories, facilitate locating of lost or stolen electronic accessories, and/or facilitate prevention of electronic accessories being forgotten, misplaced or stolen. Such techniques can be particularly advantageous with respect to wireless and/or small electronic accessories, which can be easily dropped and/or more difficult to visually detect. Embodiments can capitalize on dynamically and repeatedly analyzing the presence and/or characteristics of short-range connections, which can be correlated with a separation distance between devices. Further, embodiments can be extended to, not only devices that are directly connected (e.g., via a single short-range connection), but also to devices that are indirectly connected (e.g., via multiple short-range connections and/or one or more intermediate devices).

Embodiments of the present invention, e.g., in methods, apparatus, computer readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method comprising:
   receiving, via a master-device receiver of a master electronic device and from a first electronic accessory, a connection-indicative signal that includes a connection attribute that is indicative of a presence or a characteristic of an accessory-to-accessory connection between the first electronic accessory and a second electronic accessory, the first electronic accessory including:
      a first-accessory receiver configured to receive audio signals via a master-accessory connection from the master electronic device;
      a speaker configured to output at least part of the received audio signals; and
      a transmitter configured to transmit other audio signals via the accessory-to-accessory connection to the second electronic accessory, the other audio signals including or being based upon at least part of the audio signals; and
   performing a set of actions at one or more processors of the master electronic device, the set of actions including:
      in response to receiving the connection-indicative signal:
         identifying a location of the master electronic device; and
         updating a data structure to include the connection attribute in association with the location and a second-accessory identifier of the second electronic accessory;
      determining that a locate-accessory condition is satisfied in association with the second electronic accessory; and
      in response to the determination:
         retrieving the location from the data structure, wherein retrieving the location from the data structure includes determining that, from amongst multiple locations stored in the data structure in association with the second-accessory identifier, the location is a most recently stored location associated with a corresponding connection attribute that is above a predefined threshold; and
         facilitating a presentation that is indicative of the location.

2. The computer-implemented method of claim 1, wherein determining that the locate-accessory condition is satisfied includes receiving an input corresponding to a request to provide location data associated with the second electronic accessory.

3. The computer-implemented method of claim 1, wherein the location of the master electronic device is determined using GPS signals received at the master electronic device.

4. The computer-implemented method of claim 1, further comprising:
   determining a second connection attribute that is indicative of a presence or a characteristic of a master-to-accessory connection between the master electronic device and the first electronic accessory;

updating the data structure to include the second connection attribute in association with location data and a first-accessory identifier of the first electronic accessory.

5. The computer-implemented method of claim 4, wherein the updated data structure includes:
a data entry that includes the location, the connection attribute, and the second connection attribute; and
another data entry that includes another location, another connection attribute, and another second connection attribute.

6. The computer-implemented method of claim 1, wherein each of the first electronic accessory and the second electronic accessory includes an earphone.

7. A master electronic device comprising:
one or more data processors; and
a non-transitory computer readable storage medium containing instructions which when executed on the one or more data processors, cause the one or more data processors to perform actions including:
accessing a connection-indicative signal that includes a connection attribute that is indicative of a presence or a characteristic of an accessory-to-accessory connection between a first electronic accessory and a second electronic accessory, the connection-indicative signal having been received at the master electronic device from the first electronic accessory, the first electronic accessory including:
a receiver configured to receive audio signals via a master-accessory connection from the master electronic device;
a speaker configured to output at least part of the received audio signals; and
a transmitter configured to transmit other audio signals via the accessory-to-accessory connection to the second electronic accessory, the other audio signals including or being based upon at least part of the audio signals;
in response to receiving the connection-indicative signal:
identifying a location of the master electronic device; and
updating a data structure to include the connection attribute in association with the location and a second-accessory identifier of the second electronic accessory;
determining that a locate-accessory condition is satisfied in association with the second electronic accessory; and
in response to the determination:
retrieving the location from the data structure, wherein retrieving the location from the data structure includes determining that, from amongst multiple locations stored in the data structure in association with the second-accessory identifier, the location is a most recently stored location associated with a corresponding connection attribute that is above a predefined threshold; and
facilitating a presentation that is indicative of the location.

8. The master electronic device of claim 7, wherein determining that the locate-accessory condition is satisfied includes receiving an input corresponding to a request to provide location data associated with the second electronic accessory.

9. The master electronic device of claim 7, wherein the location of the master electronic device is determined using GPS signals received at the master electronic device.

10. The master electronic device of claim 7, wherein the actions further include:
determining a second connection attribute that is indicative of a presence or a characteristic of a master-to-accessory connection between the master electronic device and the first electronic accessory;
updating the data structure to include the second connection attribute in association with location data and a first-accessory identifier of the first electronic accessory.

11. The master electronic device of claim 10, wherein the updated data structure includes:
a data entry that includes the location, the connection attribute, and the second connection attribute; and
another data entry that includes another location, another connection attribute, and another second connection attribute.

12. The master electronic device of claim 7, wherein each of the first electronic accessory and the second electronic accessory includes an earphone.

13. A computer-program product tangibly embodied in a non-transitory machine-readable storage medium, including instructions configured to cause one or more data processors to perform actions including:
accessing connection-indicative signal that includes a connection attribute that is indicative of a presence or a characteristic of an accessory-to-accessory connection between a first electronic accessory and a second electronic accessory, the connection-indicative signal having been received from the first electronic accessory, the first electronic accessory including:
a receiver configured to receive audio signals via a master-accessory connection from a master electronic device;
a speaker configured to output at least part of the received audio signals; and
a transmitter configured to transmit other audio signals via the accessory-to-accessory connection to the second electronic accessory, the other audio signals including or being based upon at least part of the audio signals;
in response to receiving the connection-indicative signal:
identifying a location of the master electronic device; and
updating a data structure to include the connection attribute in association with the location and a second-accessory identifier of the second electronic accessory;
determining that a locate-accessory condition is satisfied in association with the second electronic accessory; and
in response to the determination:
retrieving the location from the data structure, wherein retrieving the location from the data structure includes determining that, from amongst multiple locations stored in the data structure in association with the second-accessory identifier, the location is a most recently stored location associated with a corresponding connection attribute that is above a predefined threshold; and
facilitating a presentation that is indicative of the location.

14. The computer-program product of claim 13, wherein determining that the locate-accessory condition is satisfied includes receiving an input corresponding to a request to provide location data associated with the second electronic accessory.

15. The computer-program product of claim 14, wherein the location of the master electronic device is determined using GPS signals received at the master electronic device.

16. The computer-program product of claim 13, wherein the actions further include:
- determining a second connection attribute that is indicative of a presence or a characteristic of a master-to-accessory connection between the master electronic device and the first electronic accessory;
- updating the data structure to include the second connection attribute in association with location data and a first-accessory identifier of the first electronic accessory.

17. The computer-program product of claim 16, wherein the updated data structure includes:
- a data entry that includes the location, the connection attribute, and the second connection attribute; and
- another data entry that includes another location, another connection attribute, and another second connection attribute.

* * * * *